(12) United States Patent
Usami et al.

(10) Patent No.: US 8,975,851 B2
(45) Date of Patent: Mar. 10, 2015

(54) TEMPERATURE ESTIMATING DEVICE AND TEMPERATURE ESTIMATING METHOD

(75) Inventors: Tadayoshi Usami, Kariya (JP); Nobuhiko Yoshioka, Anjyo (JP)

(73) Assignees: Advics Co., Ltd., Kariya-Shi, Aichi-Ken (JP); Denso Corporation, Kariya-Shi, Aichi-Ken (JP)

( * ) Notice: Subject to any disclaimer, the term of this patent is extended or adjusted under 35 U.S.C. 154(b) by 4 days.

(21) Appl. No.: 13/433,953

(22) Filed: Mar. 29, 2012

(65) Prior Publication Data

US 2012/0249039 A1    Oct. 4, 2012

(30) Foreign Application Priority Data

Mar. 29, 2011   (JP) ................................. 2011-073135
Mar. 29, 2011   (JP) ................................. 2011-073136

(51) Int. Cl.
*G05B 5/00*    (2006.01)
*G01K 7/42*    (2006.01)

(52) U.S. Cl.
CPC .............. *G01K 7/42* (2013.01); *G01K 2205/00* (2013.01)
USPC ............ 318/473; 318/470; 318/471; 318/476

(58) Field of Classification Search
USPC .......................................... 318/470, 471, 476
See application file for complete search history.

(56) References Cited

U.S. PATENT DOCUMENTS 5,949,488 A * 9/1999 Kim .................... 375/240.04
8,487,563 B2 * 7/2013 Kawakami et al. ...... 318/400.13
2005/0242760 A1   11/2005 Fujita et al.
2007/0153433 A1   7/2007 Sundquist
2007/0163381 A1*  7/2007 Usami et al. .................. 74/7 E
2008/0024080 A1*  1/2008 Ogawa .......................... 318/432

(Continued)

FOREIGN PATENT DOCUMENTS

JP      11-089083 A      3/1999
JP      2002-034283 A    1/2002

(Continued)

OTHER PUBLICATIONS

Japanese Notification of Reasons for Refusal dated Jul. 1, 2014 issued in the corresponding Japanese Patent Application No. 2011-073136 and English language translation (6 pages).

(Continued)

*Primary Examiner* — Paul Ip
*Assistant Examiner* — Devon Joseph
(74) *Attorney, Agent, or Firm* — Buchanan Ingersoll & Rooney PC

(57) ABSTRACT

A temperature estimating unit includes an energy calculating unit that calculates a heat generation energy rate of a motor on the basis of a difference between power input to the motor and power output from the motor, a heat radiation energy calculating unit that calculates a heat radiation energy rate from a target member on the basis of a difference between a previous temperature estimation value Tm of the target member and an ambient temperature, and a thermal coefficient of the target member, and an amount calculating unit that calculates a temperature increase rate of the target member on the basis of a difference between the heat generation energy rate and the heat radiation energy rate, and an estimation value calculating unit that calculates a current temperature estimation value of the target member on the basis of the temperature increase rate and the previous temperature estimation value.

12 Claims, 12 Drawing Sheets

(56) References Cited

U.S. PATENT DOCUMENTS

2008/0147272 A1* 6/2008 Kamiya et al. .................. 701/38
2010/0264670 A1* 10/2010 Usami et al. ................ 290/38 R

FOREIGN PATENT DOCUMENTS

| JP | 2003-014552 A | 1/2003 |
| JP | 2003-284375 A | 10/2003 |
| JP | 2006-112333 A | 4/2006 |
| JP | 2007-028887 A | 2/2007 |
| JP | 2008-109816 A | 5/2008 |
| JP | 2009-196627 A | 9/2009 |

OTHER PUBLICATIONS

Japanese Notification of Reasons for Refusal dated Sep. 9, 2014 issued in the corresponding Japanese Patent Application No. 2011-073135 and English language translation (7 pages).

* cited by examiner

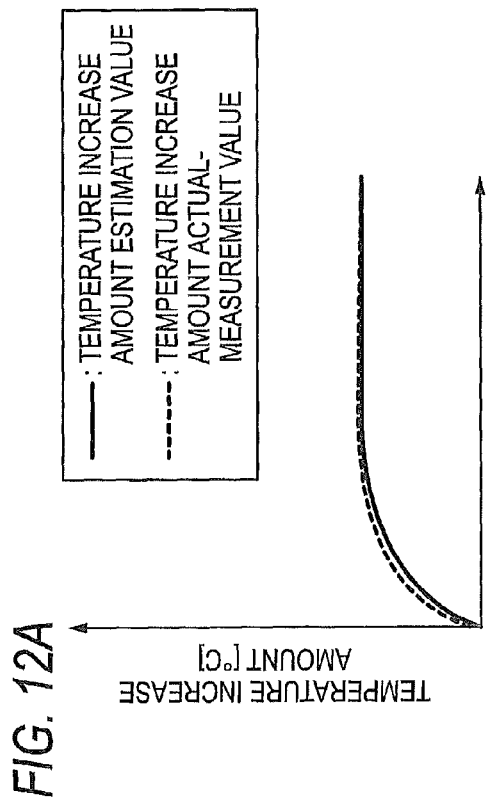
FIG. 12A
FIG. 12B
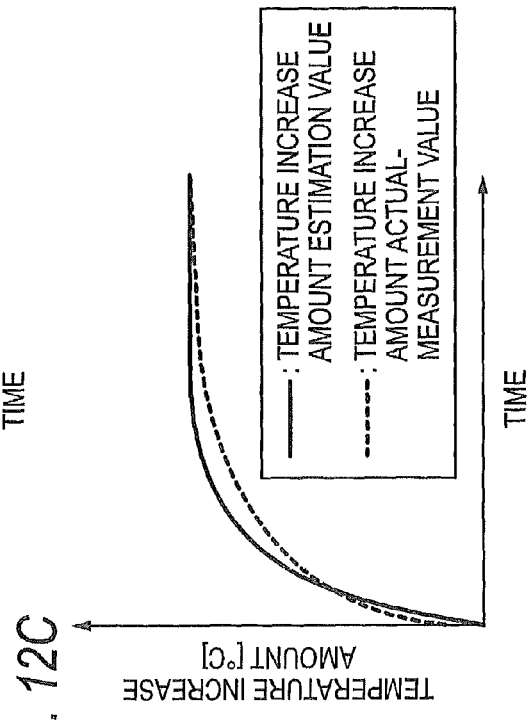
FIG. 12C
FIG. 12D

TEMPERATURE ESTIMATING DEVICE AND TEMPERATURE ESTIMATING METHOD

BACKGROUND

The present invention relates to a temperature estimating device which estimates temperatures of apparatus constituent members of an electronic apparatus provided with a motor and a temperature estimating method thereof.

In the related art, as an electronic apparatus provided with a motor, for example, an electric power steering device disclosed in JP-A-2002-34283 is proposed. In JP-A-2002-34283, a method of calculating an estimation value of a temperature increase amount of the motor without using a sensor detecting a temperature of the motor is disclosed. Specifically, an estimation value ($\Delta\theta$) of the temperature increase amount of the motor is calculated on the basis of the following formula (Formula 1). The estimation value ($\Delta\theta$) of the temperature increase amount calculated as described above is added to a temperature before starting driving the motor, thereby acquiring the temperature estimation value of the motor.

$$\Delta\theta = HTA \cdot TRS \cdot \left\{1 - \exp\left(\frac{-t}{T}\right)\right\} \quad \text{Formula 1}$$

Here, $\Delta\theta$ denotes estimation value of temperature increase amount, HTA denotes power loss of motor driving time, TRS denotes thermal resistance of motor, t denotes driving time of motor, and T denotes thermal time constant of motor.

SUMMARY

In the estimating method disclosed in JP-A-2002-34283, on the premise that the thermal time constant (T) is constant irrespective of load magnitude on the motor, the estimation value ($\Delta\theta$) of the temperature increase amount of the motor is calculated. However, in fact, it is necessary to set the thermal time constant (T) of the motor to a different value according to the load magnitude on the motor. FIG. 12A to FIG. 12D are graphs illustrating a relationship between an estimation value ($\Delta\theta$) of a temperature increase amount of a motor and a driving time (t), and a relationship between an actual temperature increase amount and a driving time (t). In the load on the driven motor, the load in the case of FIG. 12A is smallest, the load in the case of FIG. 12B is the second smallest, the load in the case of FIG. 12C is the third smallest, and the load in the case of FIG. 12D is largest.

As shown in FIG. 12A to FIG. 12D, when the load on the motor is small and the estimation value ($\Delta\theta$) of the temperature increase amount is small, a difference between the actual measurement value and the estimation value is small. However, when the load on the motor is increased and the estimation value ($\Delta\theta$) of the temperature increase amount is large, the difference between the actual measurement value and the estimation value becomes large. For this reason, when the thermal time constant (T) is set to an appropriate value according to the load on the motor, it is possible to estimate the temperature of the motor with high precision.

Even when the thermal time constant (T) is set to the value according to the load and when the load is changed during the driving of the motor, the estimation value ($\Delta\theta$) of the temperature increase amount is not accurately calculated. FIG. 13 is a graph illustrating a relationship between the estimation value ($\Delta\theta$) of the temperature increase amount and the driving time (t) of the motor when the load on the motor is changed from a first load to a second load (>the first load) at a timing t11 during the driving of the motor. When the load is increased from the middle, the heat generation amount in the motor is increased and thus the temperature increase amount of the motor is gradually increased. However, when the thermal time constant (T) is changed from a value for the first load to a value for the second load at the timing t11, the estimation value ($\Delta\theta$) of the temperature increase amount is rapidly increased at the timing t11. That is, even when the thermal time constant (T) according to the load is set, it is difficult to appropriately estimate the temperature of the motor in the course of gradually changing the temperature of the motor due to the change of the load.

When the precision of the temperature estimation value is not accurate as described above, a threshold value for start determination of a restriction control for preventing the motor from breaking down has to be set low. When the threshold value is set low as described above, there is a concern that the restriction control is started early, when it is possible to safely drive the motor as normal. The restriction control is a control for stopping the driving of the motor or slowing the driving rate of the motor during a predetermined period.

Generally, when the temperature of the motor is estimated, a temperature of a brush of the motor is estimated. This is because the motor breaks down by breakdown of the brush when the brush is overheated.

However, at the time of driving the motor, the estimation value of the temperature increase amount of the target member represented by the brush is calculated using the formula (Formula 1). However, after stopping driving the motor, in the calculation using the formula (Formula 1), the power loss (HTA) is "0 (zero)". That is, in JP-A-2002-34283, a method of estimating a temperature change amount after stopping driving the motor is not disclosed.

Accordingly, recently, a method of estimating a heat generation amount in the target member and a heat radiation amount from the target member, and estimating a temperature change amount of the target member on the basis of a difference between the heat generation amount and the heat radiation amount has been thought. In this method, even at the time of stopping the driving of the motor, it is possible to estimate the temperature change amount of the target member. Generally, the heat radiation amount from the target member is estimated considering an ambient temperature around the motor.

However, the heat radiation amount from the target member is changed depending on a temperature of a peripheral member (for example, yoke) or the like positioned around the target member, as well as the ambient temperature around the target member. For this reason, when the heat radiation amount from the target member is not estimated while also considering the temperature of the peripheral member positioned around the target member, the temperature of the target member after stopping the driving of the motor may not be estimated with high precision.

The invention has been made considering such circumstances. An object of the invention is to provide a temperature estimating device and a temperature estimating method capable of improving precision in estimation of a temperature of apparatus constituent members constituting an electronic apparatus provided with a motor, after stopping the driving of the motor.

The invention has been made considering such circumstances. Another object of the invention is to provide a temperature estimating device and a temperature estimating method capable of improving precision in estimation of a temperature of apparatus constituent members constituting an electronic apparatus provided with a motor.

To achieve the object described above, according to an aspect of the invention, there is provided a temperature estimating device which estimates temperatures of target members of apparatus constituent members constituting an electronic apparatus provided with a motor for each predetermined period, the device including: a heat generation amount calculating unit for calculating heat generation amount of the motor on the basis of a difference between an input energy corresponding value corresponding to input energy input to the motor and an output energy corresponding value corresponding to output energy output from the motor; a heat radiation amount calculating unit for calculating heat radiation amounts from the target members on the basis of a difference between previous temperature estimation values of the target members and an ambient temperature around the electronic apparatus, and thermal coefficients representing thermal characteristics of the target members; and an estimation value calculating unit for acquiring temperature increase amounts of the target members on the basis of a difference between the heat generation amount and the heat radiation amounts calculated by the calculating unit, and calculating current temperature estimation values of the target members on the basis of the temperature increase amounts and the previous temperature estimation values of the target members.

According to another aspect of the invention, there is provided a temperature estimating device which estimates a temperature of a target member of apparatus constituent members constituting an electronic apparatus provided with a motor for each predetermined period, the device including: a provisional value estimating unit for estimating a temperature provisional value of the target member; a temperature acquiring unit for acquiring temperatures of the other apparatus constituent members other than the target member of the apparatus constituent members; and an estimation value setting unit for setting a temperature estimation value of the target member, wherein the estimation value setting unit set the current temperature provisional value of the target member estimated by the provisional value estimating unit to the current temperature estimation value of the target member at the time of driving the motor, and set the current temperature estimation value of the target member on the basis of the higher one of current temperatures of the particular apparatus constituent members of a temperature lower than the temperature provisional value of the target member during the driving of the motor and the current temperature provisional value of the target member, after stopping the driving of the motor.

According to still another aspect of the invention, there is provided a temperature estimating method of estimating a temperature of a target member of apparatus constituent members constituting an electronic apparatus provided with a motor for each predetermined period, the method including: a provisional value estimating step of estimating a temperature provisional value of the target member; a temperature acquiring step of acquiring temperatures of the other apparatus constituent members other than the target member of the apparatus constituent members; an estimation value setting in motor driving step of setting the temperature provisional value of the target member estimated in the provisional value estimating step to the current temperature estimation value of the target member at the time of driving the motor; and a estimation value setting in motor stopping step of setting the current temperature estimation value of the target member, on the basis of the higher one of the current temperature of the particular apparatus constituent member of a temperature lower than that of the temperature provisional value of the target member at the time of the driving of the motor and the current temperature provisional value of the target member, after stopping the driving of the motor.

With such a configuration, it is possible to obtain an operation and an effect equivalent to those of the temperature estimating device. Although the description is performed corresponding to reference numerals and signs representing the embodiment to easily describe the invention, it is obvious that the invention is not limited to the embodiment.

BRIEF DESCRIPTION OF THE DRAWINGS

FIG. 12A to FIG. 12D are graphs illustrating a relationship between an estimation value of a temperature increase amount of a motor calculated by the estimation method of the related art and a driving time of the motor, and a relationship between an actual-measurement value of a temperature increase amount and a driving time of the motor.

DESCRIPTION OF EXEMPLARY EMBODIMENTS

Figure 1:
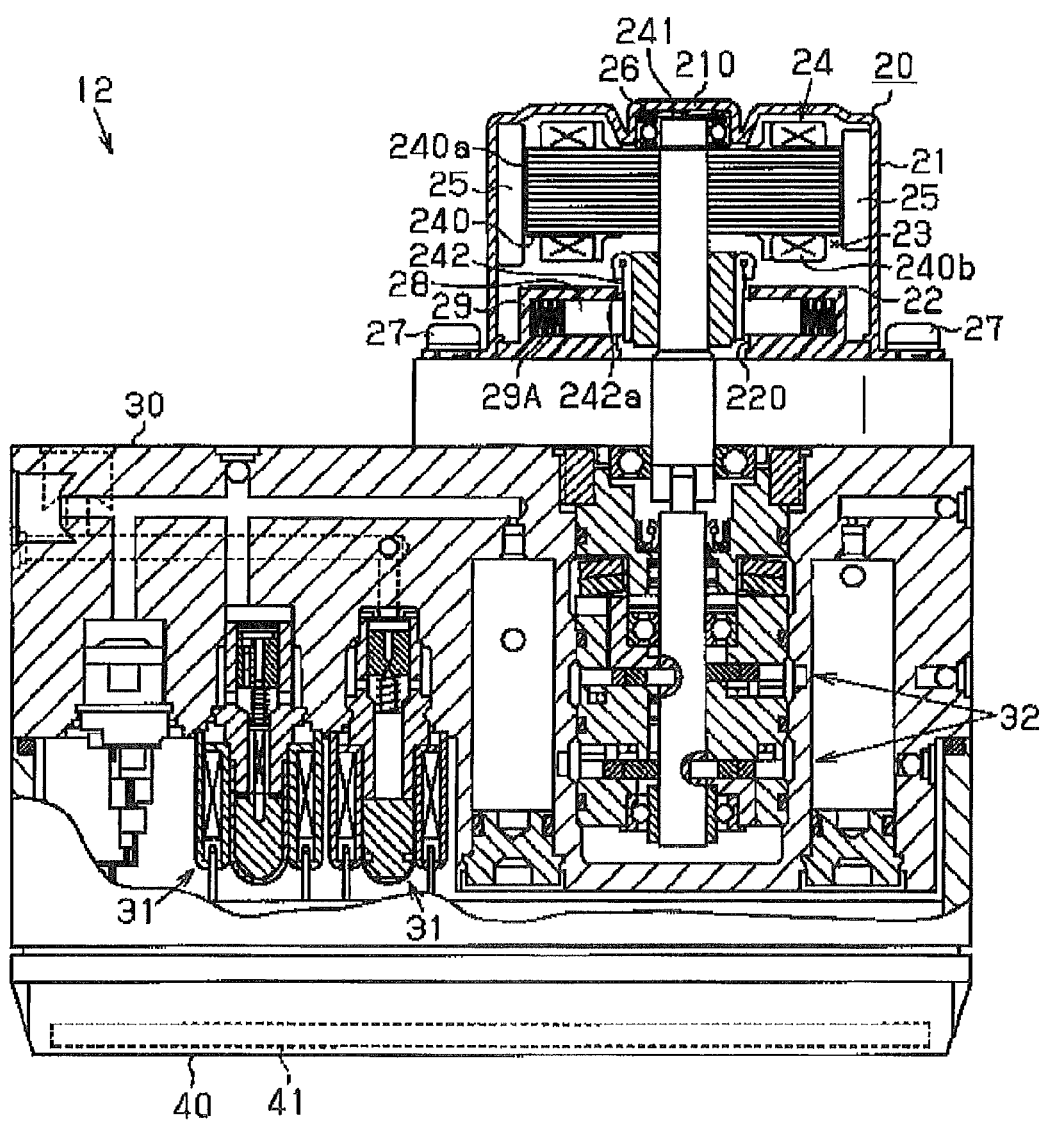
FIG. 1 is a cross-sectional view illustrating a hydro-brake unit of an electronic apparatus provided with a temperature estimating device according to an embodiment of the invention.
Figure 2:
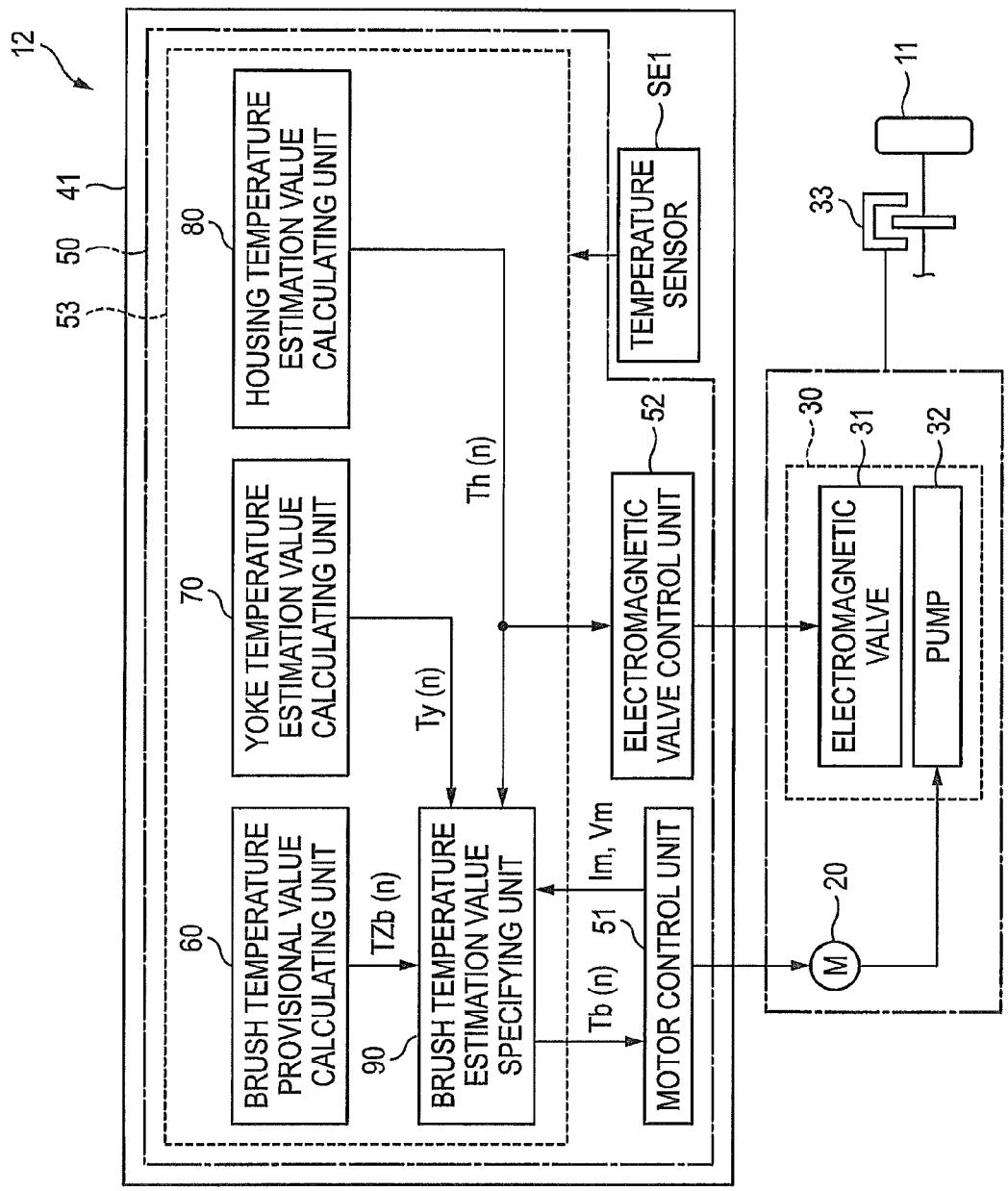
FIG. 2 is a block diagram illustrating a schematic configuration of the hydro-brake unit.

Hereinafter, an embodiment of the invention will be described with reference to FIG. 1 to FIG. 11. As shown in FIG. 1 and FIG. 2, an electronic apparatus of the embodiment is a hydro-brake unit 12 operating to adjust braking force against a wheel 11 mounted on a vehicle. The hydro-brake unit 12 includes a motor 20, a substantially rectangular parallelepiped housing (apparatus constituent member) 30 in which the motor 20 is provided, an accommodation case 40 that is fixed at a position (in the embodiment, the opposite position) different from the installation position of the motor 20 in the housing 30.

The motor 20 of the embodiment is a direct-current motor provided with a brush. The motor 20 includes a substantially cylindrical bottomed yoke (apparatus constituent member) 21 opened to the housing 30 side, a plate-shaped end plate (apparatus constituent member) 22 closing the opening portion of the yoke 21, and a rotor 24 disposed in an internal space 23 formed by the yoke 21 and the end plate 22. The yoke 21 is formed of metal suppressing leakage of magnetic field generated in the internal space 23 to the outside. On an inner circumference face of the yoke 21, a plurality of magnets (apparatus constituent member) 25 are fixed at regular intervals along a circumferential direction. Substantially at the center of the bottom of the yoke 21, a bearing supporting portion 210 in which a bearing (apparatus constituent member) 26 is accommodated is integrally formed. The yoke 21 is fixed to the housing 30 by a plurality (in FIG. 1, only two bolts are shown) of bolts 27. That is, the motor 20 is mounted on the housing 30 through the yoke 21.

The end plate 22 is formed of synthetic resin. At the center of the end plate 22, a through-hole 220 piercing in a plate thickness direction is formed. The end plate 22 is integrally provided with a brush holder 29 supporting a plurality of brushes (apparatus constituent members) 28 coming in contact with the rotor 24. The brush holder 29 supports the brushes 28 through an urging member (apparatus constituent member) 29A disposed on the outside in a diameter direction of the brushes 28. That is, the brushes 28 are urged to the inside in the diameter direction by the urging member 29A.

An armature 240 of the rotor 24 is disposed to be opposed to the magnet 25 fixed to the yoke 21. The armature 240 has a core (apparatus constituent member) 240a and a plurality of armature coils (apparatus constituent member) 240b wound on the core 240a. An output shaft (apparatus constituent member) 241 of the rotor 24 is rotatably supported by the yoke 21 through the bearing 26 accommodated in the bearing supporting portion 210. The armature 240 is fixed to the output shaft 241. The output shaft 241 pierces the through-hole 220 formed in the end plate 22 and protrudes into the housing 30. A commutator (apparatus constituent member) 242 of the rotor 24 is fixed to a part closer to the housing 30 than the armature 240 in the output shaft 241. In an outer circumference of the commutator 242, a plurality of commutator pieces 242a electrically connected to an armature coil 240b are disposed at regular intervals along the circumferential direction.

The brushes 28 are disposed on the outside of the commutator 242 in the diameter direction. The brushes 28 come in contact with the commutator pieces 242a of the commutator 242. Electric current is supplied from the brushes 28 to the armature coil 240b through the commutator pixels 242a.

The housing 30 is formed of a material (for example, metal such as aluminum) which is excellent from the viewpoint of weight and hardness. In the housing 30, various electromagnetic valves 31 for adjusting braking force against the wheel 11 and a pump 32 as an example of a driving unit using the motor 20 as a driving source are accommodated. Liquid pressure in a wheel cylinder 33 provided in the wheel 11 of the vehicle is adjusted by operations of the various electromagnetic valves 31 and the pump 32. As a result, the braking force according to the liquid pressure of the wheel cylinder 33 is applied to the wheel 11.

In the accommodation case 40, a circuit board 41 is accommodated. As shown in FIG. 2, the circuit board 41 is provided with a control device 50 formed of a CPU, a ROM, and a RAM, a temperature sensor SE1 for detecting a temperature of the circuit board 41, and various driver circuits (not shown) for driving the electromagnetic valve 31 and the motor 20.

Next, the control device 50 of the embodiment will be described with reference to FIG. 2, FIG. 3, and FIG. 4. As shown in FIG. 2, the control device 50 includes a motor control unit 51 that controls the motor 20, an electromagnetic valve control unit 52 that controls various electromagnetic valves 31, and a temperature estimating unit 53 as an example of a temperature estimating device, as functional units configured by software.

The motor control unit 51 is electrically connected to a current sensor (not shown) for detecting a current value flowing in the motor 20, and a'voltage sensor (not shown) for detecting a voltage value applied to the motor 20. The motor control unit 51 acquires a current value Im flowing in the motor 20 and a voltage value Vm applied to the motor 20 on the basis of detection signals from the sensors. The motor control unit 51 outputs input information for specifying the acquired current value Im and voltage value Vm to the temperature estimating unit 53.

Temperature information for specifying a temperature estimation value Tb(n) of the brush 28 of the motor 20 calculated by the temperature estimating unit 53 is input to the motor control unit 51. The motor control unit 51 determines whether or not the temperature estimation value Tb(n) specified by the input temperature information is equal to or larger than a preset temperature threshold value to determine whether or not the motor 20 is overheated. The motor control unit 51 performs a restriction control of continuing the control of the motor 20 when the temperature estimation value Tb(n) is smaller than the temperature threshold value, and restricting the driving of the motor 20 when the temperature estimation value Tb(n) is equal to or larger than the temperature threshold value. As the restriction control, for example, there may be a control of stopping the driving of the motor 20 during a predetermined period and a control of restricting the driving of the motor 20 at a rate equal to or higher than a regular rate.

Temperature information for specifying the temperature estimation value Th(n) of the housing 30 calculated by the temperature estimating unit 53 is input to the electromagnetic valve control unit 52. The electromagnetic valve control unit 52 sets a current value flowing in the electromagnetic valve 31 on the basis of the temperature estimation value Th(n) of the housing 30 specified by the input temperature information. That is, the current value flowing in the electromagnetic valve 31 is corrected by the temperature estimation value Th(n) of the housing 30.

The temperature estimating unit 53 estimates temperatures of a plurality of apparatus constituent members constituting the hydro-brake unit 12. Specifically, the temperature estimating unit 53 estimates temperatures of the brush (target member) 28 of the motor 20, and the yoke 21 and the housing 30 as an example of the other apparatus constituent members other than the brush 28 of the members constituting the motor 20. The temperature estimating unit 53 includes a brush temperature provisional value calculating unit 60 as an example of a provisional value estimating unit, a yoke temperature estimation value calculating unit 70 as an example of a temperature acquiring unit, a housing temperature estimation value calculating unit 80 has an example of a temperature acquiring unit, and a brush temperature estimation value specifying unit 90 as an example of an estimation value setting unit, as functional units. Thermal capacity of the yoke 21 and the housing 30 is higher than the thermal capacity of the brush 28. That is, in the embodiment, the yoke 21 and the housing 30 correspond to particular apparatus constituent members.

First, the brush temperature provisional value calculating unit 60 will be described. The brush temperature provisional value calculating unit 60 calculates a temperature provisional value TZb(n) of the brush 28 considering a heat generation amount in the motor 20 and a heat radiation amount from the brush 28. As shown in FIG. 3, the brush temperature provisional value calculating unit 60 includes an input power calculating unit 61, an output power calculating unit 62, a heat generation energy calculating unit 63, an ambient temperature calculating unit 64, a heat radiation energy calculating unit 65, a temperature increase amount calculating unit 66, a temperature provisional value calculating unit 67, and a temperature provisional value storing unit 68, as functional units.

The input power calculating unit 61 calculates the input power Pin input to the motor 20 as an example of an input energy corresponding value corresponding to the input energy input to the motor 20. Specifically, the input power calculating unit 61 calculates the input power Pin by substituting the current value Im and the voltage value Vm specified by the input information from the motor control unit 51 for the following formula (Formula 2). The input power calculating unit 61 outputs the calculated input power Pin to the heat generation energy calculating unit 63.

$$Pin = Vm \cdot Im \qquad \text{Formula 2}$$

The output power calculating unit 62 calculates the output power Pout output from the motor 20 as an example of an output energy corresponding value corresponding to the output energy output from the motor 20. Specifically, the output power calculating unit 62 estimates the number of rotations N and a driving torque T of the motor 20 on the basis of a period of a ripple (that is, periodical fluctuation) included in the current value Im specified by the input information from the motor control unit 51. Subsequently, the output power calculating unit 62 calculates the output power Pout by substituting the number of rotations N of the output shaft 241 of the motor 20 and the driving torque T of the motor 20 for the following formula (Formula 3). The output power calculating unit 62 outputs the calculated output power Pout to the heat generation energy calculating unit 63.

$$Pout = 0.14796 \cdot N \cdot T \qquad \text{Formula 3}$$

The heat generation energy calculating unit 63 calculates a heat generation energy rate Ein that is a heat generation amount per unit time of the motor 20. A unit of the heat generation energy rate Ein is "J/s (Joule/second)". Specifically, the heat generation energy calculating unit 63 subtracts the output power Pout calculated in the output power calculating unit 62 from the input power Pin calculated in the input power calculating unit 61 such that the subtraction result (=Pin−Pout) is the heat generation energy rate Ein of the motor 20. In the embodiment, the heat generation amount per unit time of the motor 20 is called "heat generation energy rate" to clarify that the unit is a value obtained by dividing "J (Joule)" by "time (second)". The heat generation energy calculating unit 63 outputs the calculated heat generation energy rate Ein to the temperature increase amount calculating unit 66. Accordingly, in the embodiment, the heat generation energy calculating unit 63 serves as the heat generation amount calculating unit for calculating the heat generation energy rate Ein of the motor 20 on the basis of the difference (=Pin−Pout) between the input power Pin and the output power Pout.

The ambient temperature calculating unit 64 detects a temperature in the accommodation case 40 on the basis of the detection signal from the temperature sensor SE1 provided on the circuit board 41, and estimates an ambient temperature Tf around the motor 20 on the basis of the temperature in the accommodation case 40. For example, the ambient temperature calculating unit 64 adds a preset offset value to the detected temperature in the accommodation case 40 such that the obtained value is the ambient temperature Tf. The offset value is a value corresponding to a temperature difference between the inside of the accommodation case 40 and the periphery of the motor 20, and is set by a test or simulation. The ambient temperature calculating unit 64 outputs the calculated ambient temperature Tf to the heat radiation energy calculating unit 65.

The heat radiation energy calculating unit 65 calculates a heat radiation energy rate Eout (Eout_B) that is a heat radiation amount per unit time emitted from the motor 20. A unit of the heat radiation energy rate Eout is "J/s (Joule/second)". Specifically, the heat radiation energy calculating unit 65 reads a temperature provisional value TZb(n−1) of the brush 28 calculated at the previous timing from the temperature provisional value storing unit 68. The heat radiation energy calculating unit 65 calculates the heat radiation energy rate Eout_B from the motor 20 by substituting the previous temperature provisional value TZb(n−1) of the brush 28, the ambient temperature Tf calculated by the ambient temperature calculating unit 64, and the thermal coefficient A representing the thermal characteristics of the brush 28 for the following formula (Formula 3). Subsequently, the heat radiation energy calculating unit 65 outputs the calculated heat radiation energy rate Eout_B from the brush 28 to the temperature increase amount calculating unit 66. Accordingly, in the embodiment, the heat radiation energy calculating unit 65 serves as the heat radiation amount calculating unit for calculating the heat radiation energy rate Eout_B from the brush 28 on the basis of a difference between the previous temperature provisional value TZb(n−1) of the brush 28 and the ambient temperature Tf, and the thermal coefficient A representing the thermal characteristics of the brush 28. In the embodiment, the heat radiation amount per unit time emitted from the target member is called "heat radiation energy rate" to clarify that the unit is a value obtained by dividing "J (Joule)" by "time (second)".

$$Eout = \frac{TZb(n-1) - Tf}{A} \qquad \text{Formula 4}$$

The thermal coefficients A representing the thermal characteristics of the apparatus constituent members such as the brush 28, the yoke 21, and the housing 30 will be described with reference to FIG. 4. The thermal coefficient A is a coefficient representing a relationship (slopes of straight lines in FIG. 4) between the heat generation energy rate transmitted to the target member shown in FIG. 4 and the increase amount of the temperature increase amount of the target member.

Figure 4:
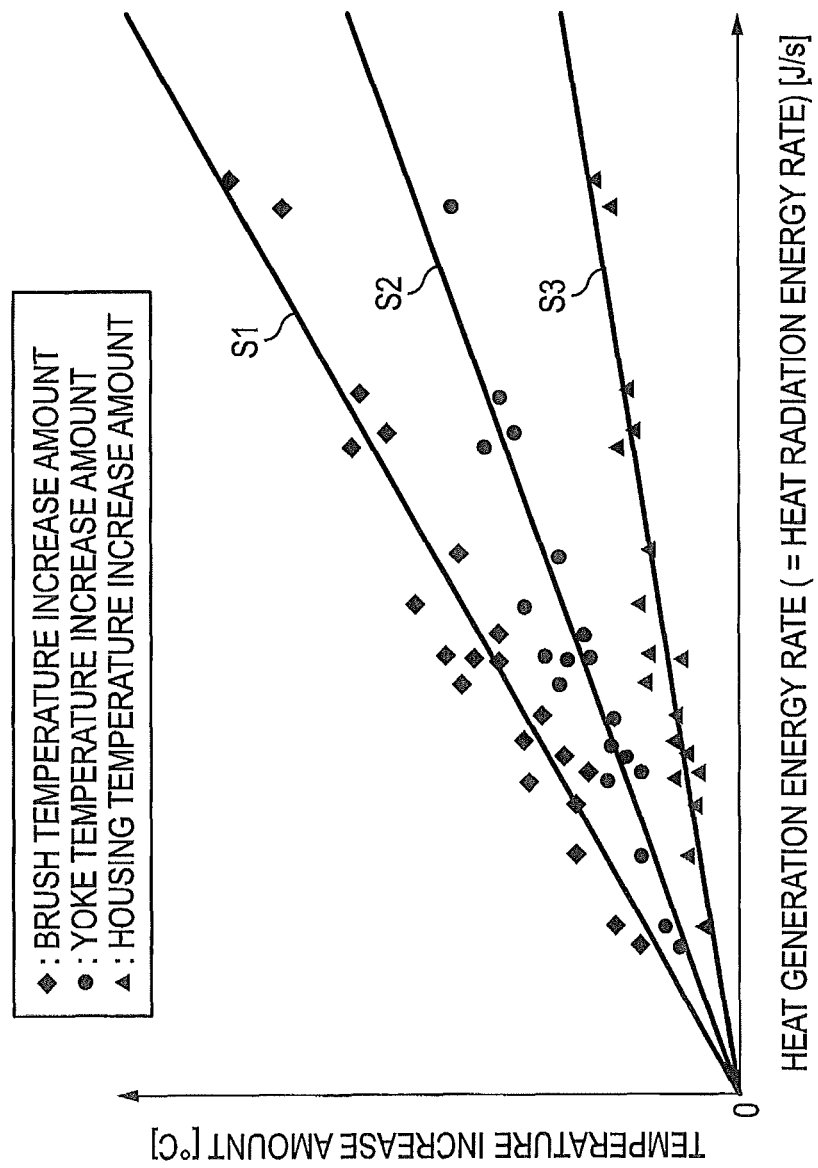
FIG. 4 is a graph illustrating a heat generation energy rate and a temperature increase amount of an apparatus constituent member.

The graph shown in FIG. 4 is drawn as the following description. First, at the regular temperature ambient (for example, 30° C.), the temperature sensor is mounted on the apparatus constituent member, and the motor 20 is driven in a state where it is possible to measure the number of rotations N and the driving torque T of the motor 20. In this case, a predetermined current value Im and a predetermined voltage value Vm are given to the motor 20. By the driving of the motor 20, the temperature of the apparatus constituent member is increased while the heat generation energy rate is higher than the heat radiation energy rate. However, when the temperature of the apparatus constituent member is increased, the heat radiation energy rate is gradually raised, and the temperature increase rate of the apparatus constituent member is lowered. When the heat generation energy rate and the heat radiation energy rate are balanced, the temperature of the apparatus constituent member is not changed. Thereafter, by substituting the current value Im and the voltage value Vm given to the motor 20 for the formula (Formula 2), the input power Pin to the motor 20 is calculated, the output power Pout from the motor 20 is calculated on the basis of the formula (Formula 3), and the temperature of the apparatus constituent member is detected on the basis of the detection signal from the temperature sensor.

By subtracting the output power Pout from the input power Pin calculated after it becomes the state where the temperature of the apparatus constituent member is not changed, the heat generation energy rate Ein of the motor 20 is calculated. The heat generation energy rate Ein of the motor 20 calculated as described above and the temperature increase amount of the apparatus constituent member after starting driving the motor 20 are acquired as the measurement result. A plurality of such measurement results are acquired by changing the input power Pin to the motor 20. The plurality of acquired measurement results are plotted to draw the graph shown in FIG. 4.

The state where the temperature of the apparatus constituent member is not changed is a state where the heat generation energy rate Ein of the motor 20 and the heat radiation energy rate Eout from the apparatus constituent member are balanced. For this reason, the heat generation energy rate Ein of the motor 20 based on the input power Pin and the output power Pout calculated in the state where the temperature of the apparatus constituent member is not changed may be the heat radiation energy rate Eout from the apparatus constituent member at this time point. That is, the graph shown in FIG. 4 is also a graph illustrating a relationship between the heat radiation energy rate Eout from the apparatus constituent member and the temperature increase amount of the apparatus constituent member.

As clarified from FIG. 4, the temperature increase amount of the brush 28 that is an example of the apparatus constituent member gets larger as the heat generation energy rate Ein of the motor 20 gets higher. The temperature increase amount of the brush 28 and the heat generation energy rate Ein are in a proportional relationship. That is, the relationship between the temperature increase amount of the brush 28 and the heat generation energy rate Ein can be represented by a linear function. In FIG. 4, the linear function representing the relationship between the temperature increase amount and the heat generation energy rate Ein is represented by a first straight line S1. A slope representing the first straight line S1 corresponds to the thermal coefficient A of the brush 28.

Similarly, the temperature increase amount of the yoke 21 that is an example of the apparatus constituent member and the heat generation energy rate Ein of the motor 20 are in a proportional relationship. That is, the relationship between the temperature increase amount of the yoke 21 and the heat generation energy rate Ein can be represented by a linear function. In FIG. 4, the linear function representing the relationship between the temperature increase amount of the yoke 21 and the heat generation energy rate Ein is represented by a second straight line S2. A slope representing the second straight line S2 corresponds to the thermal coefficient A of the yoke 21.

Similarly, the temperature increase amount of the housing 30 that is an example of the apparatus constituent member and the heat generation energy rate Ein of the motor 20 are in a proportional relationship. That is, the relationship between the temperature increase amount of the housing 30 and the heat generation energy rate Ein can be represented by a linear function. In FIG. 4, the linear function representing the relationship between the temperature increase amount of the housing 30 and the heat generation energy rate Ein is represented by a third straight line S3. A slope representing the third straight line S3 corresponds to the thermal coefficient A of the housing 30.

In the embodiment, the thermal coefficient A of the brush 28 among the brush 28, the yoke 21, and the housing 30 is largest, the thermal coefficient A of the yoke 21 is second largest, and the thermal coefficient A of the housing 30 is smallest. This is determined according to the material constituting the apparatus constituent member, the volume of the apparatus constituent member, and the distance between the motor 20 and the apparatus constituent member (see FIG. 1). The thermal coefficients A of the members acquired as described above are prepared in advance.

Figure 3:
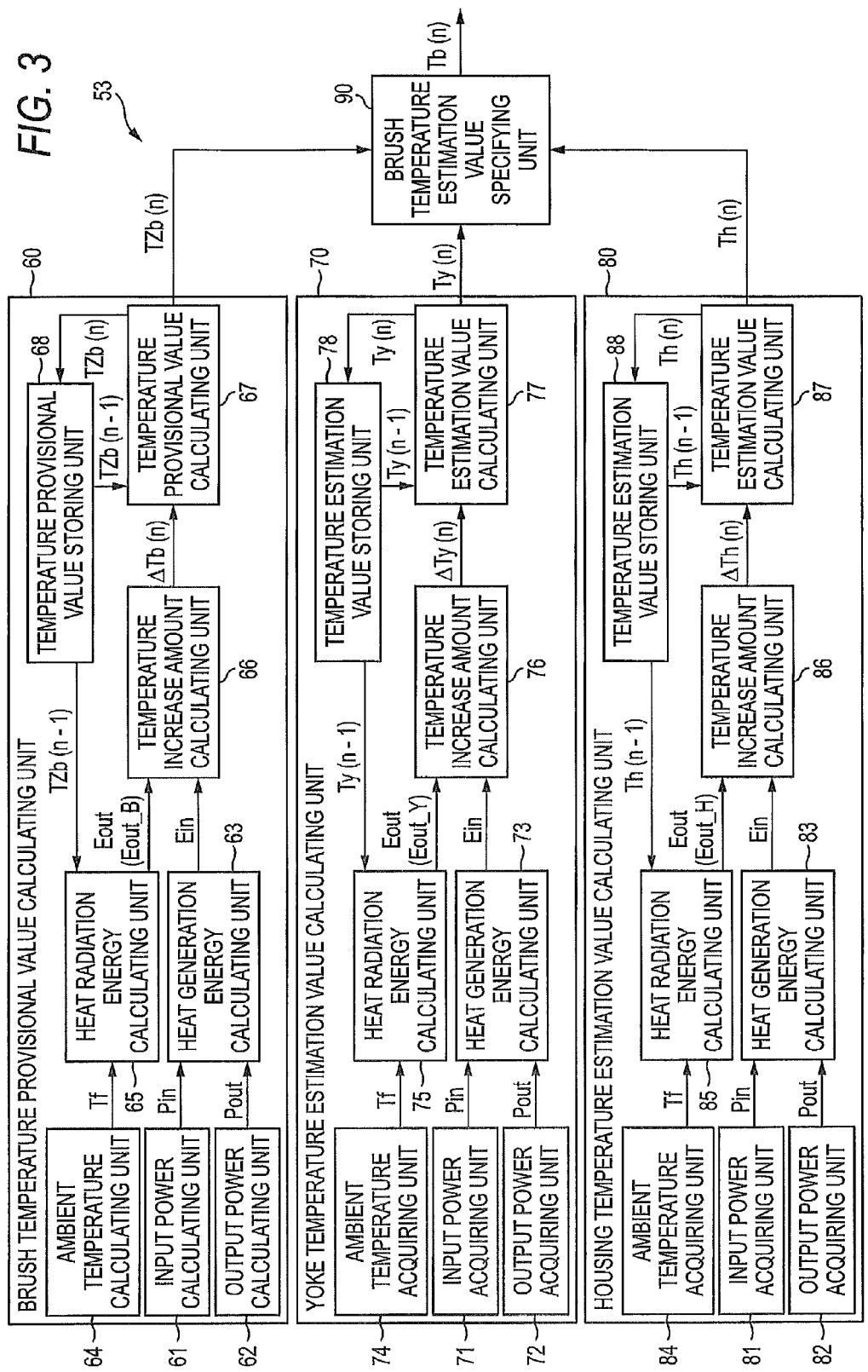
FIG. 3 is a block diagram illustrating a function of a temperature estimating unit in detail.

As shown in FIG. 3, the temperature increase amount calculating unit 66 calculates the temperature increase rate $\Delta Tb(n)$ that is the estimation value of the temperature increase amount per unit time of the brush 28. Specifically, the temperature increase amount calculating unit 66 calculates the temperature increase rate $\Delta Tb(n)$ of the brush 28 by substituting the heat generation energy rate Ein calculated in the heat generation energy calculating unit 63 and the heat radiation energy rate Eout (Eout_B) calculated in the heat radiation energy calculating unit 65 for the following formula (Formula 5). The temperature increase amount calculating unit 66 outputs the calculated temperature increase rate $\Delta Tb(n)$ to the temperature provisional value calculating unit 67. A coefficient K for the brush 28 is a constant representing the temperature increase amount per "1 J (Joule)", and is a proportional constant representing how the temperature of the brush 28 is changed by the input and output of the energy to and from the brush 28.

$$\Delta Tb(n)=(Ein-Eout)\cdot K \quad \text{Formula 5}$$

The temperature provisional value calculating unit 67 calculates the current temperature provisional value TZb(n) of the brush. Specifically, the temperature provisional value calculating unit 67 calculates the current temperature provisional value TZb(n) of the brush 28 by substituting the temperature increase rate $\Delta Tb(n)$ calculated in the temperature increase amount calculating unit 66 and the previous temperature provisional value TZb(n−1) of the brush 28 stored in the temperature provisional value storing unit 68. In the formula (Formula 6), a time is a time corresponding to a calculation interval of the temperature provisional value TZb. That is, the "$\Delta Tb(n)\cdot ts$" in the formula (Formula 6) corresponds to the estimation value of the temperature increase amount of the brush 28 at the time corresponding to a predetermined period. Accordingly, in the embodiment, the provisional value calculating unit for calculating the current temperature provisional value TZb(n) of the brush 28 is configured by the temperature increase amount calculating unit 66 and the temperature provisional value calculating unit 67. The temperature provisional value calculating unit 67 stores the calculated current temperature provisional value TZb(n) of the brush 28 in the temperature provisional value storing unit 68, and outputs it to the brush temperature estimation value specifying unit 90.

$$TZb(n)=TZb(n-1)+\Delta Tb(n)\cdot ts \qquad \text{Formula 6}$$

Next, the yoke temperature estimation value calculating unit 70 will be described.

The yoke temperature estimation value calculating unit 70 calculates the temperature estimation value Ty(n) of the yoke 21 considering the heat generation amount in the motor 20 and the heat radiation amount from the yoke 21. The yoke temperature estimation value calculating unit 70 includes an input power acquiring unit 71, an output power acquiring unit 72, a heat generation energy calculating unit 73, an ambient temperature acquiring unit 74, a heat radiation energy calculating unit 75, a temperature increase amount calculating unit 76, and a temperature estimation value calculating unit 77, and a temperature estimation value storing unit 78, as functional units.

The input power acquiring unit 71 acquires the input power Pin calculated in the input power calculating unit 61 of the brush temperature provisional value calculating unit 60, and outputs the input power Pin to the heat generation energy calculating unit 73. The output power acquiring unit 72 acquires the output power Pout calculated in the output power calculating unit 62 of the brush temperature provisional value calculating unit 60, and outputs the output power Pout to the heat generation energy calculating unit 73.

The heat generation energy calculating unit 73 calculates the heat generation energy rate Ein that is the heat generation amount per unit time of the motor 20 by the same method as that of the heat generation energy calculating unit 63 of the brush temperature provisional value calculating unit 60, and outputs the heat generation energy rate Ein to the temperature increase amount calculating unit 76. Accordingly, in the embodiment, the heat generation energy calculating unit 73 serves as the heat generation amount calculating unit for calculating the heat generation energy rate Ein of the motor 20 on the basis of the difference (=Pin−Pout) between the input power Pin and the output power Pout.

The ambient temperature acquiring unit 74 acquires the ambient temperature Tf calculated in the ambient temperature calculating unit 64 of the brush temperature provisional value calculating unit 60, and outputs the ambient temperature Tf to the heat radiation energy calculating unit 75.

The heat radiation energy calculating unit 75 calculates the heat radiation energy rate Eout that is the heat radiation amount per unit time emitted from the yoke 21. Specifically, the heat radiation energy calculating unit 75 reads the temperature estimation value Ty(n−1) of the yoke 21 calculated at the previous timing from the temperature estimation value storing unit 78. The heat radiation energy calculating unit 75 calculates the heat radiation energy rate Eout (Eout_Y) from the yoke 21 using the formula (Formula 4). In this case, the heat radiation energy calculating unit 75 calculates the heat radiation energy rate Eout_Y from the yoke 21 by substituting the previous temperature estimation value Ty(n−1) of the yoke 21 for the previous temperature provisional value TZb (n−1) of the brush 28. Accordingly, in the embodiment, the heat radiation energy calculating unit 75 serves as the heat radiation amount calculating unit for calculating the heat radiation energy rate Eout_Y from the yoke 21 on the basis of the difference between the previous temperature estimation value Ty(n−1) of the yoke (the other apparatus constituent member) 21 and the ambient temperature Tf, and the thermal coefficient A representing the thermal characteristics of the yoke 21.

The temperature increase amount calculating unit 76 calculates the temperature increase rate $\Delta Ty(n)$ that is the estimation value of the temperature increase amount per unit time of the yoke 21. Specifically, the temperature increase amount calculating unit 76 calculates the temperature increase rate $\Delta Ty(n)$ of the yoke 21 by substituting the heat generation energy rate Ein calculated in the heat generation energy calculating unit 73 and the heat radiation energy rate Eout (Eout_Y) calculated in the heat radiation energy calculating unit 75 for the formula (Formula 5). In this case, as a coefficient K for the yoke 21, a reciprocal of thermal capacity of the yoke 21 is set. The temperature increase amount calculating unit 76 outputs the calculated temperature increase rate $\Delta Ty$(n) to the temperature estimation value calculating unit 77.

The temperature estimation value calculating unit 77 calculates the current temperature estimation value Ty(n) of the yoke 21 using the formula (Formula 6). In this case, the temperature estimation value calculating unit 77 substitutes the previous temperature estimation value Ty(n−1) of the yoke 21 for the previous temperature provisional value TZb (n−1) of the brush 28, and substitutes the temperature increase rate $\Delta Ty(n)$ of the yoke 21 for the temperature increase rate $\Delta Tb(n)$ of the brush 28. Accordingly, in the embodiment, the estimation value calculating unit for estimating the current temperature estimation value Ty(n) of the yoke (the other apparatus constituent member) 21 is configured by the temperature increase amount calculating unit 76 and the temperature estimation value calculating unit 77. The temperature estimation value calculating unit 77 stores the calculated current temperature estimation value Ty(n) of the yoke 21 in the temperature estimation value storing unit 78, and outputs it to the brush temperature estimation value specifying unit 90.

Next, the housing temperature estimation value calculating unit 80 will be described. The housing temperature estimation value calculating unit 80 calculates the temperature estimation value Th(n) of the housing 30 considering the heat generation amount in the motor 20 and the heat radiation amount from the housing 30. The housing temperature estimation value calculating unit 80 includes an input power acquiring unit 81, an output power acquiring unit 82, a heat generation energy calculating unit 83, an ambient temperature acquiring unit 84, a heat radiation energy calculating unit 85, a temperature increase amount calculating unit 86, and a temperature estimation value calculating unit 87, and a temperature estimation value storing unit 88, as functional units.

The input power acquiring unit 81 acquires the input power Pin calculated in the input power calculating unit 61 of the brush temperature provisional value calculating unit 60, and outputs the input power Pin to the heat generation energy calculating unit 83. The output power acquiring unit 82 acquires the output power Pout calculated in the output power calculating unit 62 of the brush temperature provisional value calculating unit 60, and outputs the output power Pout to the heat generation energy calculating unit 83.

The heat generation energy calculating unit 83 calculates the heat generation energy rate Ein that is the heat generation amount per unit time of the motor 20 by the same method as that of the heat generation energy calculating unit 63 of the brush temperature provisional value calculating unit 60, and outputs the heat generation energy rate Ein to the temperature increase amount calculating unit 86. Accordingly, in the embodiment, the heat generation energy calculating unit 83 serves as the heat generation amount calculating unit for calculating the heat generation energy rate Ein of the motor 20 on the basis of the difference (=Pin−Pout) between the input power Pin and the output power Pout.

The ambient temperature acquiring unit 84 acquires the ambient temperature Tf calculated in the ambient temperature calculating unit 64 of the brush temperature provisional value calculating unit 60, and outputs the ambient temperature Tf to the heat radiation energy calculating unit 85.

The heat radiation energy calculating unit 85 calculates the heat radiation energy rate Eout (Eout_H) that is the heat radiation amount per unit time emitted from the housing 30. Specifically, the heat radiation energy calculating unit 85 reads the temperature estimation value Th(n−1) of the housing 30 calculated at the previous timing from the temperature estimation value storing unit 88. The heat radiation energy calculating unit 85 calculates the heat radiation energy rate Eout_H from the housing 30 using the formula (Formula 4). In this case, the heat radiation energy calculating unit 85 calculates the heat radiation energy rate Eout_H from the housing 30 by substituting the previous temperature estimation value Th(n−1) of the housing 30 for the previous temperature provisional value TZb(n−1) of the brush 28. Accordingly, in the embodiment, the heat radiation energy calculating unit 85 serves as the heat radiation amount calculating unit for calculating the heat radiation energy rate Eout_H from the housing 30 on the basis of the difference between the previous temperature estimation value Th(n−1) of the housing (the other apparatus constituent member) 30 and the ambient temperature Tf, and the thermal coefficient A representing the thermal characteristics of the housing 30.

The temperature increase amount calculating unit 86 calculates the temperature increase rate ΔTh(n) that is the estimation value of the temperature increase amount per unit time of the housing 30. Specifically, the temperature increase amount calculating unit 86 calculates the temperature increase rate ΔTh(n) of the housing 30 by substituting the heat generation energy rate Ein calculated in the heat generation energy calculating unit 83 and the heat radiation energy rate Eout (Eout_H) calculated in the heat radiation energy calculating unit 85. In this case, as a coefficient K for the housing 30, a reciprocal of the thermal capacity of the housing 30 is set. The temperature increase amount calculating unit 86 outputs the calculated temperature increase rate ΔTh(n) to the temperature estimation value calculating unit 87.

The temperature estimation value calculating unit 87 calculates the current temperature estimation value Th(n) of the housing 30 using the formula (Formula 6). In this case, the temperature estimation value calculating unit 87 substitutes the previous temperature estimation value Th(n−1) of the housing 30 for the previous temperature provisional value TZb(n−1) of the brush 28, and substitutes the temperature increase rate ΔTh(n) of the housing 30 for the temperature increase rate ΔTb(n) of the brush 28. Accordingly, in the embodiment, the estimation value calculating unit for estimating the current temperature estimation value Th(n) of the housing (the other apparatus constituent member) 30 is configured by the temperature increase amount calculating unit 86 and the temperature estimation value calculating unit 87. The temperature estimation value calculating unit 87 stores the calculated current temperature estimation value Th(n) of the housing 30 in the temperature estimation value storing unit 88, and outputs it to the brush temperature estimation value specifying unit 90.

Next, the brush temperature estimation value calculating unit 90 will be described. The brush temperature estimation value specifying unit 90 specifies (sets) the current temperature estimation value Tb(n) of the brush 28 on the basis of the current temperature provisional value TZb(n) of the brush 28, the current temperature estimation value Ty(n) of the yoke 21, and the current temperature estimation value Th(n) of the housing 30. Specifically, the brush temperature estimation value specifying unit 90 sets the current temperature provisional value TZb(n) of the brush 28 to the current temperature estimation value Tb(n) of the brush 28 at the time of driving the motor 20. Meanwhile, at the time of stopping after driving the motor 20, the brush temperature estimation value specifying unit 90 sets the largest value of the current temperature provisional value TZb(n) of the brush 28, the current temperature estimation value Ty(n) of the yoke 21, and the current temperature estimation value Th(n) of the housing 30, to the current temperature estimation value Tb(n) of the brush 28.

Figure 5:
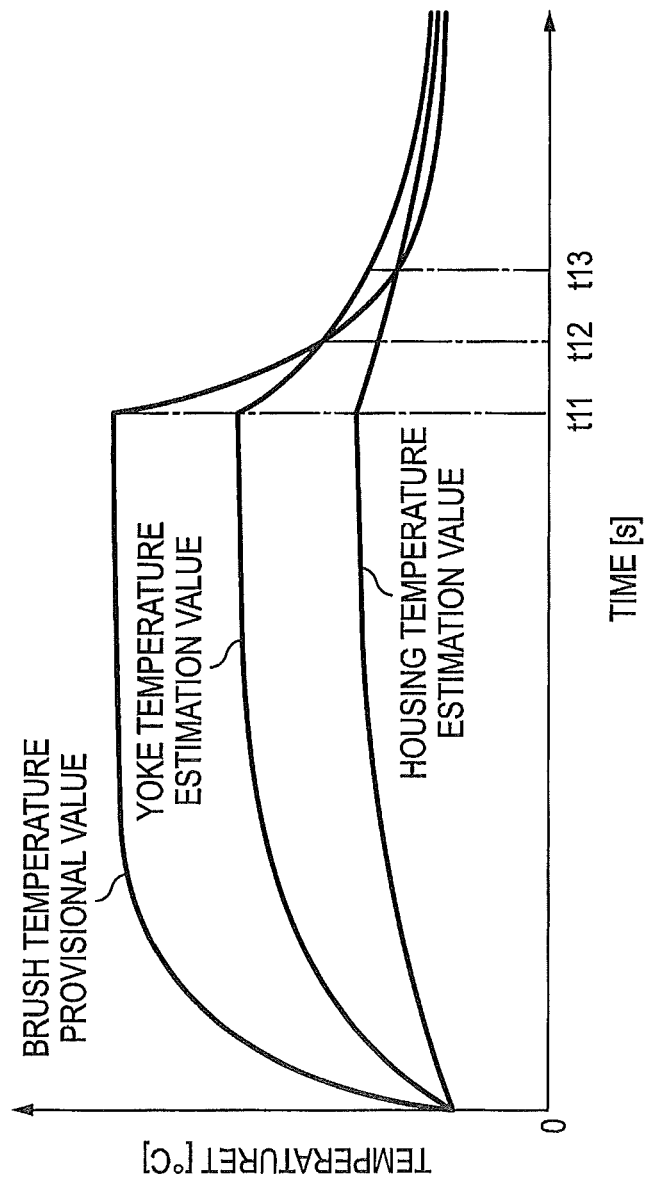
FIG. 5 is a graph illustrating change of a temperature provisional value of a brush, a temperature estimation value of a yoke, and a temperature estimation value of a housing.

The reason why the temperature of the brush 28 is estimated by the method described above will be described with reference to FIG. 5 to FIG. 7. In the graph shown in FIG. 5, the temperature provisional value TZb of the brush 28, the temperature estimation value Ty of the yoke 21, and the temperature estimation value Th of the housing 30 are plotted. As shown in FIG. 5, during the driving of the motor 20, the temperature provisional value TZb of the brush 28, which is a heat generation source, with the lowest thermal capacity becomes a value larger than the temperature estimation values Ty and Th of the yoke 21 and the housing 30. The temperature estimation value Ty of the yoke 21 with the second lowest thermal capacity becomes a value larger than the temperature estimation value Th of the housing 30.

Meanwhile, after the first timing t11 of stopping the driving of the motor 20, the temperature provisional value TZb of the brush 28 and the temperature estimation values Ty and Th of the yoke 21 and the housing 30 become small. Particularly, the temperature provisional value TZb of the brush 28 with the smallest thermal capacity becomes rapidly small. The temperature provisional value TZb of the brush 28 becomes smaller than the temperature estimation value Ty of the yoke 21 at the time point of elapsing the second timing t12, and becomes smaller than the temperature estimation value Th of the housing 30 at the time point of elapsing the third timing t13 thereafter.

After stopping the driving of the motor 20, the temperature of the brush 28 is not changed similarly to the temperature provisional value TZb of FIG. 5. That is, the actual heat radiation energy rate from the brush 28 is determined by the temperature of the other member (in this case, the yoke 21 or the housing 30) positioned around the brush 28, not only by the temperature around the brush 28, that is, the ambient temperature Tf, particularly, at the time of stopping the motor 20. Since the thermal capacity of the yoke 21 and the housing 30 is higher than the thermal capacity of the brush 28, the temperatures of the yoke 21 and the housing 30 are not rapidly decreased similarly to the brush 28.

That is, after stopping the motor 20, while the temperature of the brush 28 is higher than that of the yoke 21, the heat is moved from the brush 28 to the yoke 21 or the housing 30, and thus the temperature of the brush 28 is rapidly changed. However, when the temperature of the brush 28 is substantially the same as that of the yoke 21, there is little heat movement between the brush 28 and the yoke 21, and thus the temperature of the brush 28 is not even lower than the temperature of the yoke 21. That is, the temperature of the brush 28 is decreased substantially at the same rate as the temperature of the yoke 21.

When the second timing t12 is elapsed, the heat of the brush 28 and the yoke 21 is moved to the housing 30 with the temperature higher than those of the brush 28 and the yoke 21. However, when the temperatures of the brush 28 and the yoke 21 become substantially the same temperature as the temperature of the housing 30, there is little heat movement between the brush 28 and yoke 21 and the housing 30, and thus the temperatures of the brush 28 and the yoke 21 are not even lower than the temperature of the housing 30. That is, the temperatures of the brush 28 and the yoke 21 are decreased substantially at the same rate as the temperature of the housing 30.

Figure 6A:
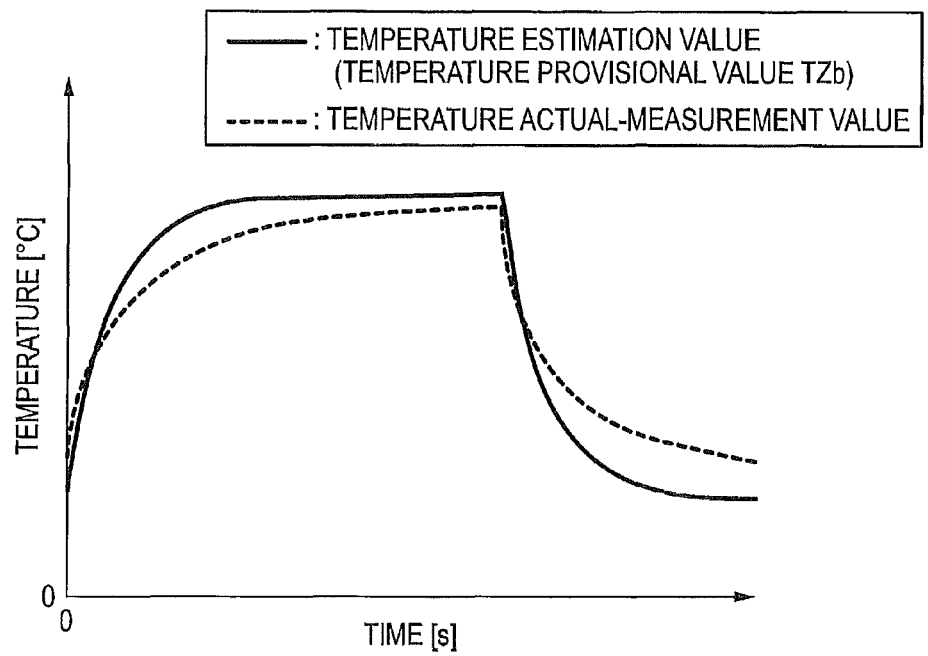
FIG. 6A is a graph illustrating comparison between a temperature estimation value and a temperature actual-measurement value when a temperature provisional value is the temperature estimation value of the brush even after stopping the driving of the motor.

On the contrary, the temperature provisional value TZb is calculated on the basis of the heat generation energy rate Ein in the motor 20 and the heat radiation energy rate Eout_B calculated using the ambient temperature Tf. That is, the temperature provisional value TZb is a value calculated without adding the temperature of the other apparatus constituent member positioned around the brush 28. For this reason, as shown in FIG. 6A, after stopping the driving of the motor 20, there is a concern that the temperature provisional value TZb may be disparate from the actual temperature of the brush 28.

Figure 6B:
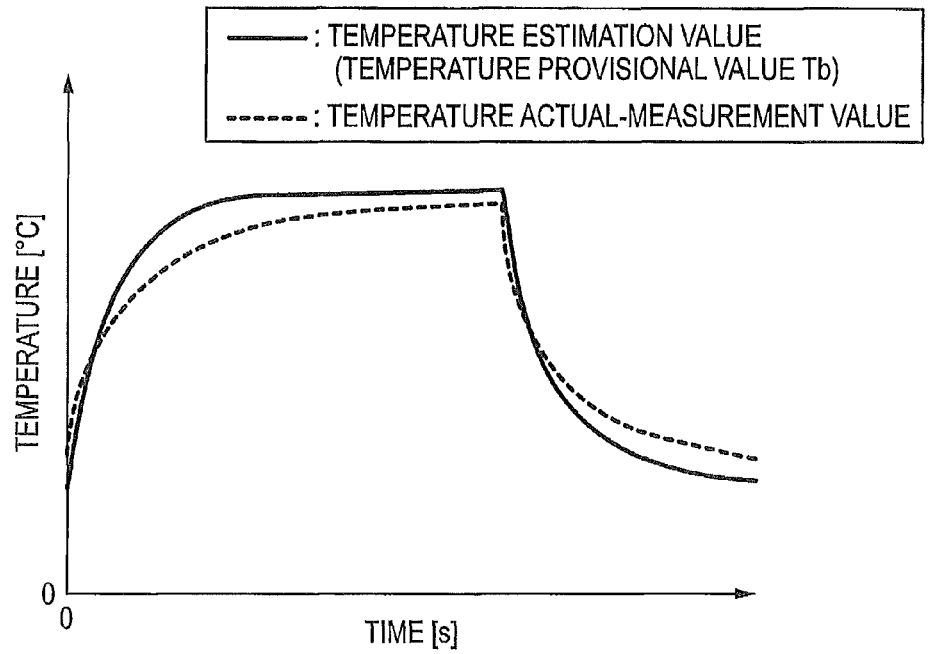
FIG. 6B is a graph illustrating a temperature estimation value and a temperature actual-measurement value when the temperature estimation value of the brush is set considering the temperature estimation values of the yoke and the housing after stopping the motor.

Accordingly, in the embodiment, during the driving of the motor 20 and at the time from the stopping of the driving to the second timing t12, the temperature provisional value TZb is larger than the temperature estimation values Ty and Th of the yoke 21 and the housing 30, and thus the temperature provisional value TZb becomes the temperature estimation value Tb of the brush 28. From the time the second timing t21 to the time until the temperature estimation value Ty of the yoke 21 becomes smaller than the temperature estimation value Th of the housing 30, the temperature provisional value TZb is smaller than the temperature estimation value Ty of the yoke 21, and thus the temperature estimation value Ty of the yoke 21 becomes the temperature estimation value Tb of the brush 28. When the temperature estimation value Ty of the yoke 21 is smaller than the temperature estimation value Th of the housing 30, the temperature estimation value Th of the housing 30 becomes the temperature estimation value Tb of the brush 28. As a result, as shown in FIG. 6A and FIG. 6B, after stopping the driving of the motor 20, the temperature estimation value Tb of the brush 28 becomes a value close to the actual-measurement value of the temperature of the brush 28 as compared with the temperature provisional value TZb.

Figure 7A:
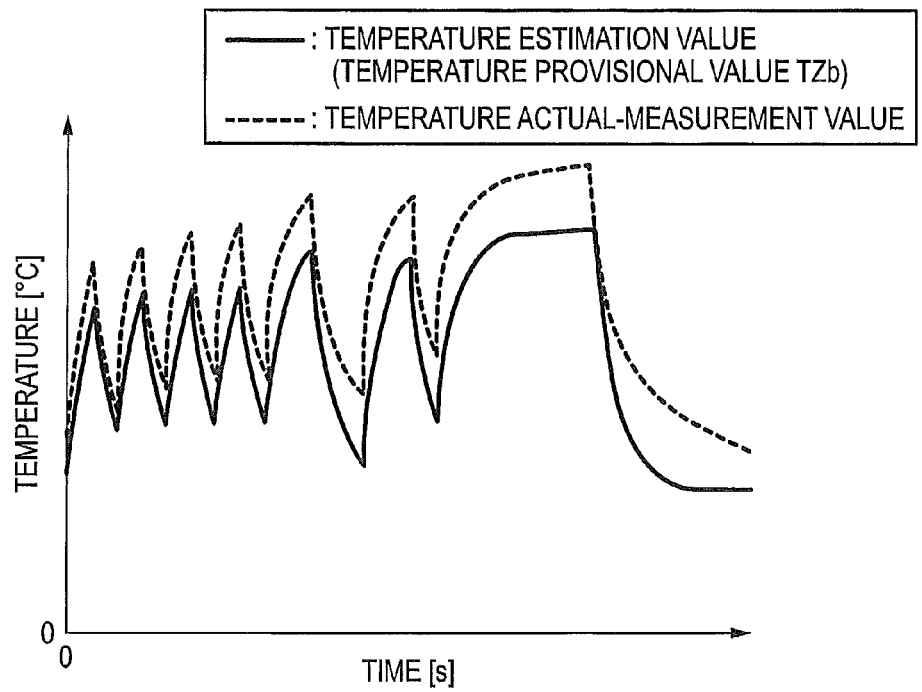
FIG. 7A is a graph illustrating comparison between a temperature estimation value and a temperature actual-measurement value when a temperature provisional value is the temperature estimation value of the brush even after stopping the motor.
Figure 7B:
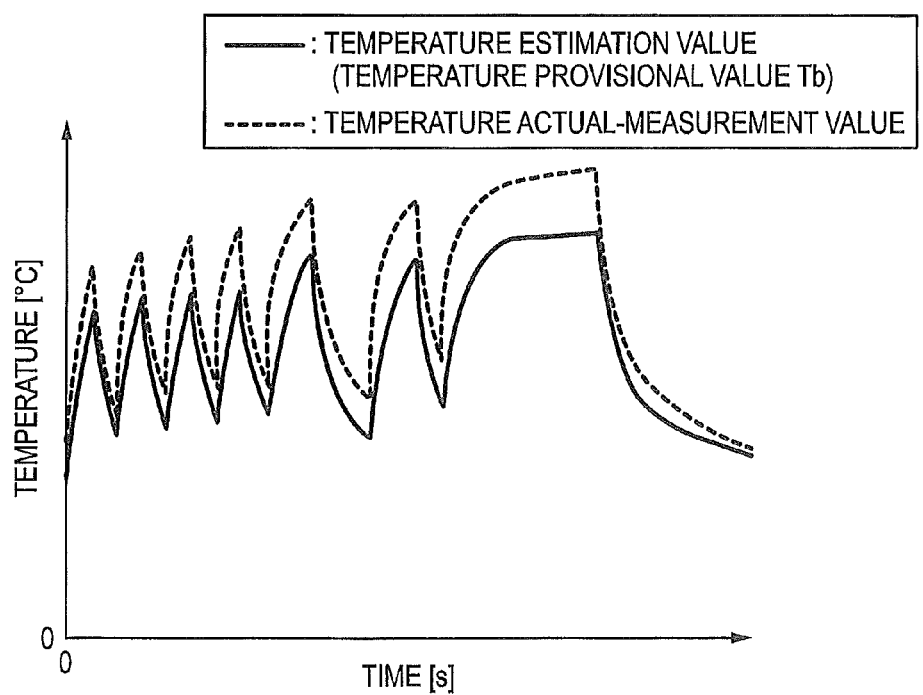
FIG. 7B is a graph illustrating comparison between a temperature estimation value and a temperature actual-measurement value when the temperature estimation value of the brush is set considering the temperature estimation values of the yoke and the housing after stopping the motor.

FIG. 7A and FIG. 7B show that the temperature provisional value TZb of the brush 28 and the temperature estimation value Tb of the brush 28 are fluctuated when the driving and the stopping of the motor 20 are continuously repeated. As shown in FIG. 7A and FIG. 7B, even when the driving and the stopping of the motor 20 are continuously repeated, the temperature estimation value Tb of the brush 28 set by the estimation method of the embodiment becomes a value closer to the actual-measurement value of the temperature of the brush 28 than the temperature provisional value TZb (see FIG. 7A) of the brush 28.

Figure 8:
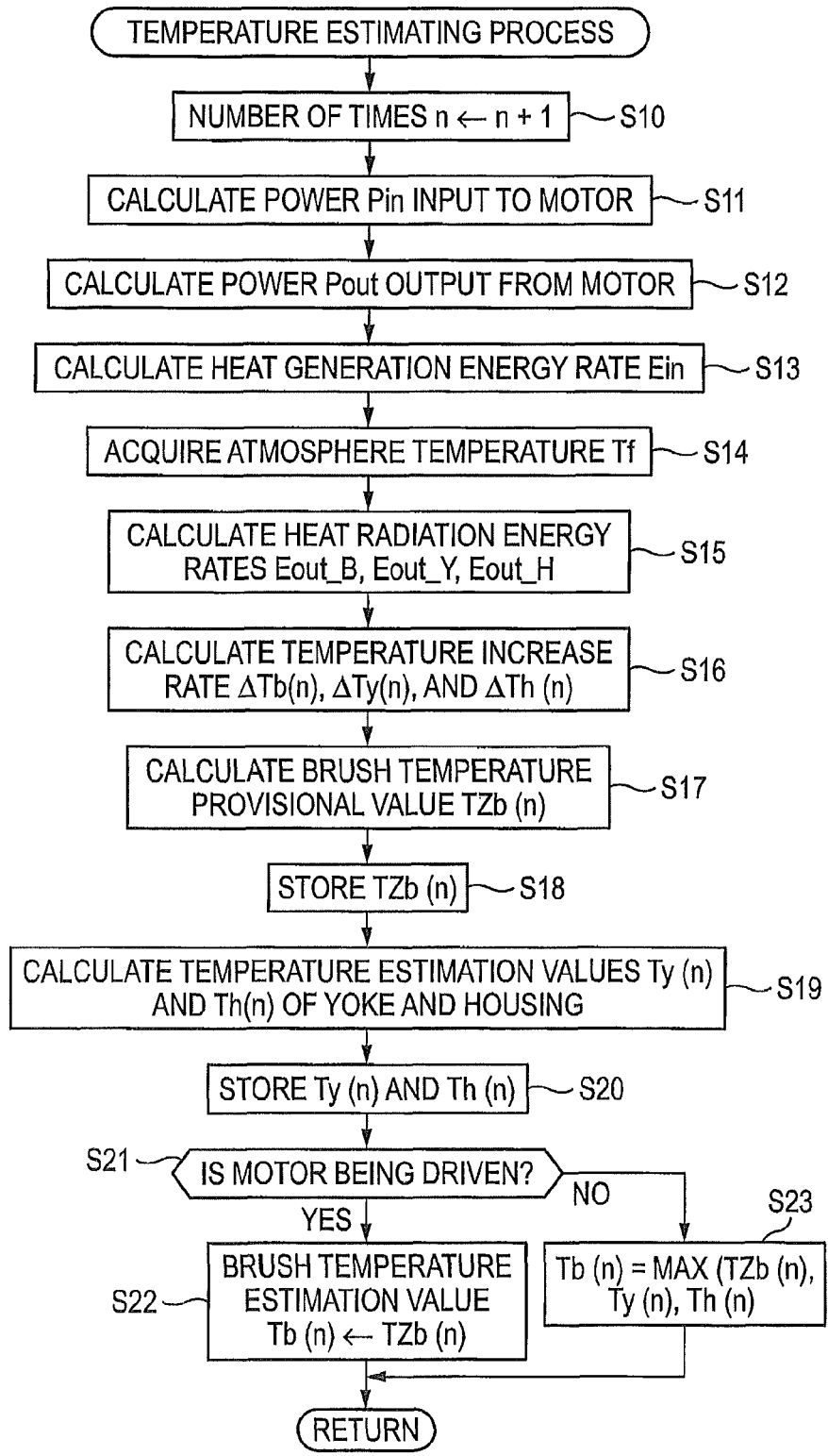
FIG. 8 is a flowchart illustrating a temperature estimating process routine in the embodiment.

Next, a temperature estimating process routine for estimating the temperatures of the brush 28 and the yoke 21 of the motor 20, and the housing 30 will be described with reference to a flowchart shown in FIG. 8. The temperature estimating process routine is a process routine performed for each preset predetermined period. That predetermined period coincides with the time ts.

In the temperature estimating process routine, the temperature estimating unit 53 increases the number of times n by "1" (Step S10). Subsequently, the temperature estimating unit 53 calculates the input power Pin to the motor 20 using the formula (Formula 2) (Step S11), and calculates the output power Pout from the motor 20 using the formula (Formula 3) (Step S12). That is, in Step S11, the current value Im flowing in the motor 20 is multiplied by the voltage value Vin applied to the motor 20, thereby obtaining the input power Pin. In Step S12, the number of rotations N of the motor 20 is multiplied by the driving torque T and the constant (=0.14796), thereby obtaining the output power Pout.

The temperature estimating unit 53 subtracts the output power Pout calculated in Step S12 from the input power Pin calculated in Step S11 to calculate the heat generation energy rate Ein (=Pin−Pout) from the motor 20 (Step S13). Subsequently, the temperature estimating unit 53 acquires the ambient temperature Tf of the installation environment of the motor 20 (Step S14).

The temperature estimating unit 53 calculates the heat radiation energy rate Eout_B from the brush 28, the heat radiation energy rate Eout_Y from the yoke 21, and the heat radiation energy rate Eout_H from the housing 30 using the formula (Formula 4) (Step S15). That is, the ambient temperature Tf is subtracted from the previous temperature provisional value TZb(n−1) of the brush 28, and the subtraction value (=(TZb(n−1)−Tf)) is divided by the thermal coefficient A representing the thermal characteristics of the brush 28, thereby obtaining the heat radiation energy rate Eout_B of the brush 28. The ambient temperature Tf is subtracted from the previous temperature estimation value Ty(n−1) of the yoke 21, and the subtraction value (=(Ty(n−1)−Tf)) is divided by the thermal coefficient A representing the thermal characteristics of the yoke 21, thereby obtaining the heat radiation energy rate Eout_Y of the yoke 21. The ambient temperature Tf is subtracted from the previous temperature estimation value Th(n−1) of the housing 30, and the subtraction value (=(Th(n−1)−Tf)) is divided by the thermal coefficient A representing the thermal characteristics of the housing 30, thereby obtaining the heat radiation energy rate Eout_H of the housing 30.

Subsequently, the temperature estimating unit 53 calculates the temperature increase rate $\Delta Tb(n)$ of the brush 28, the temperature increase rate $\Delta Ty(n)$ of the yoke 21, and the temperature increase rate $\Delta Th(n)$ of the housing 30 using the formula (Formula 5) (Step S16). That is, the heat radiation energy rate Eout_B of the brush 28 is subtracted from the heat generation energy rate Ein of the motor 20, and the subtraction value (=(Ein−Eout_B)) is multiplied by the coefficient K for the brush 28, thereby obtaining the current temperature increase rate $\Delta Tb(n)$ of the brush 28. The heat radiation energy rate Eout_Y of the yoke 21 is subtracted from the heat generation energy rate Ein of the motor 20, and the subtraction value (=(Ein−Eout_Y)) is multiplied by the coefficient K for the yoke 21, thereby obtaining the current temperature increase rate $\Delta Ty(n)$ of the yoke 21. The heat radiation energy rate Eout_H of the housing 30 is subtracted from the heat generation energy rate Ein of the motor 20, and the subtraction value (=(Ein−Eout_H)) is multiplied by the coefficient K for the housing 30, thereby obtaining the current temperature increase rate $\Delta Th(n)$ of the housing 30.

Hereinafter, the reason why the heat generation energy rate Ein of the motor 20 is used instead of the heat generation energy rate of the target member when the temperature increase rate of the target member is calculated will be described. The main heat generation source of the hydro-brake unit 12 is the motor 20. When the motor 20 is driven, the heat generated on the basis of the driving is transmitted to the apparatus constituent members constituting the hydro-brake unit 12. As a result, the temperatures of the apparatus constituent members are increased. That is, the temperature increase of the apparatus constituent members is a temperature increase based on the driving of the motor 20. For this reason, the temperature increase rates of the apparatus constituent members are substantially proportional to the driving rate of the motor 20, that is, the heat generation energy rate Ein of the motor 20. For this reason, even when the heat generation energy rate of the target member is not individually acquired, the current temperature increase rates of the apparatus constituent members are obtained using the heat generation energy rate Ein of the motor 20.

Returning to the description of the flowchart, the temperature estimating unit 53 calculates the current temperature provisional value TZb(n) of the brush 28 using the formula (Formula 6) (Step S17). That is, the current temperature increase rate ΔTb(n) of the brush 28 is multiplied by the time ts, and the previous temperature provisional value TZb(n−1) of the brush 28 is added to the temperature increase amount (=(ΔTb(n)·ts)) at a predetermined period, thereby obtaining the current temperature provisional value TZb(n) of the brush 28. Accordingly, in the embodiment, Step S17 corresponds to the provisional value estimating step.

Subsequently, the temperature estimating unit 53 stores the current temperature provisional value TZb(n) of the brush 28 calculated in Step S17 in the temperature provisional value storing unit 68 (Step S18). The temperature estimating unit 53 calculates the current temperature estimation value Ty(n) of the yoke 21 and the current temperature estimation value Th(n) of the housing 30 using the formula (Formula 6) (Step S19). That is, the current temperature increase rate ΔTy(n) of the yoke 21 is multiplied by the time ts, and the previous temperature estimation value Ty(n−1) of the yoke 21 is added to the temperature increase amount (=(ΔTy(n)·ts)) at a predetermined period, thereby obtaining the current temperature estimation value Ty(n) of the yoke 21. Similarly, the current temperature increase rate ΔTh(n) of the housing 30 is multiplied by the time ts, and the previous temperature estimation value Th(n−1) of the housing 30 is added to the temperature increase amount (=(ΔTh(n)·ts)) at a predetermined period, thereby obtaining the current temperature estimation value Th(n) of the housing 30. Accordingly, in the embodiment, Step S19 corresponds to the temperature acquiring step.

Subsequently, the temperature estimating unit 53 stores the current temperature estimation value Ty(n) of the yoke 21 calculated in Step S19 in the temperature estimation value storing unit 78, and stores the current temperature estimation value Th(n) of the housing 30 in the temperature estimation value storing unit 88 (Step S20). The temperature estimating unit 53 determines whether or not the motor 20 is being driven (Step S21). When the motor 20 is being driven (Step S21: Yes), the temperature estimating unit 53 sets the current temperature provisional value TZb(n) of the brush 28 calculated in Step S17 to the current temperature estimation value Tb(n) of the brush 28 (Step S22). Thereafter, the temperature estimating unit 53 ends the temperature estimating process routine once. Accordingly, in the embodiment, Step S22 corresponds to the estimation value setting in motor driving step.

Meanwhile, when the motor 20 is stopped (Step S21: No), the temperature estimating unit 53 sets the higher one of the current temperature provisional value TZb(n) of the brush 28 calculated in Step S17, the current temperature estimation value Ty(n) of the yoke 21 calculated in Step S19, and the current temperature estimation value Th(n) of the housing 30, to the current temperature estimation value Tb(n) of the brush 28 (Step S23). Thereafter, the temperature estimating unit 53 ends the temperature estimating process routine once. Accordingly, in the embodiment, Step S23 corresponds to the estimation value setting in motor stopping step.

In the embodiment, the temperature increase rate ΔTm(n) of the target member is calculated for each predetermined period, and the temperature increase amount of the target member at the predetermined period is calculated on the basis of the temperature increase rate ΔTm(n). The current temperature estimation value Tm(n) of the target member is calculated by adding the calculated temperature increase amount to the previous temperature estimation value Tm(n−1) of the target member.

Figure 9:
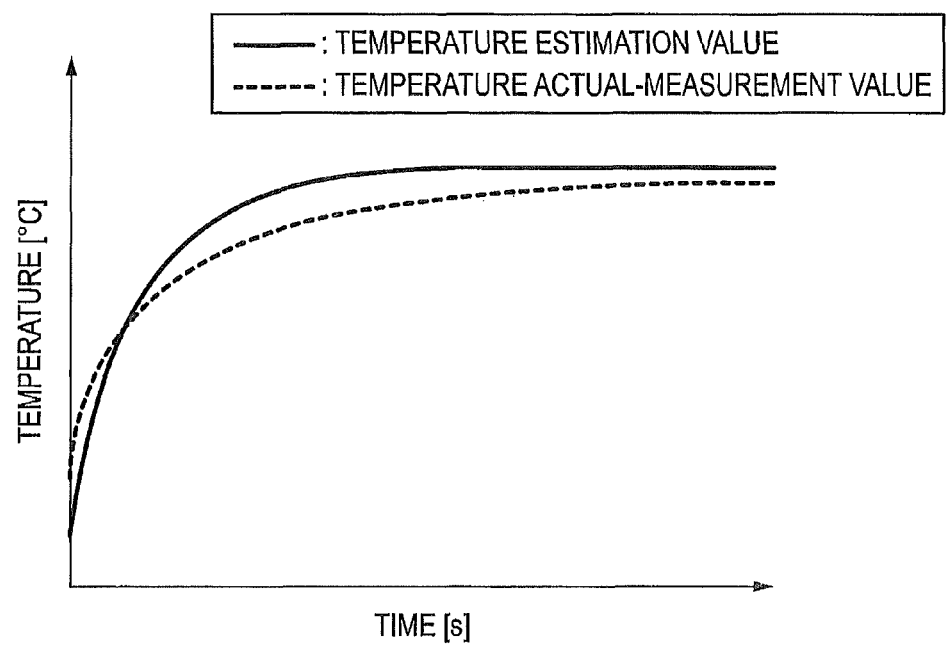
FIG. 9 is a graph illustrating comparison between a temperature actual-measurement and a temperature estimation value of the brush of the motor.
Figure 10:
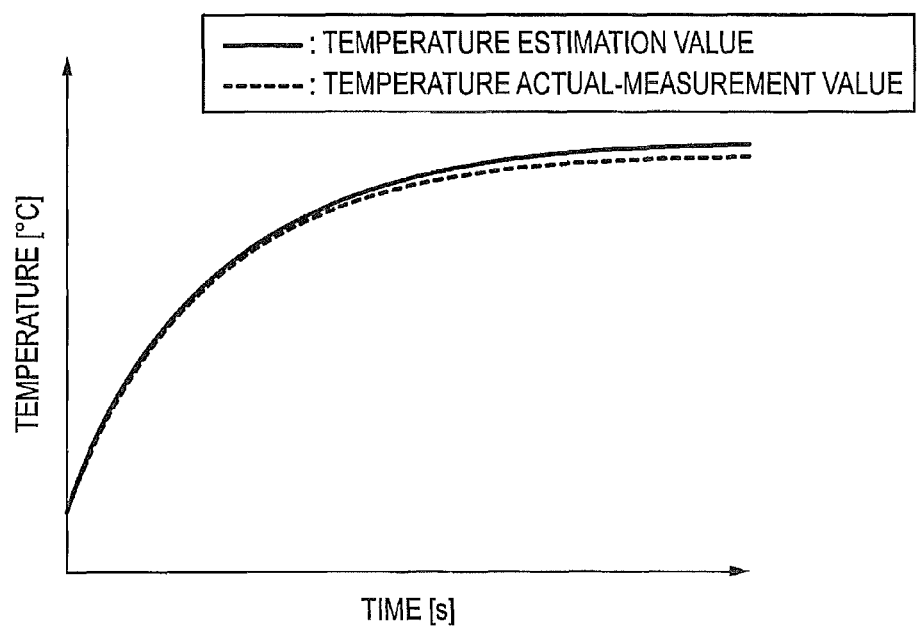
FIG. 10 is a graph illustrating comparison between a temperature actual-measurement value and a temperature estimation value of the yoke of the motor.
Figure 11:
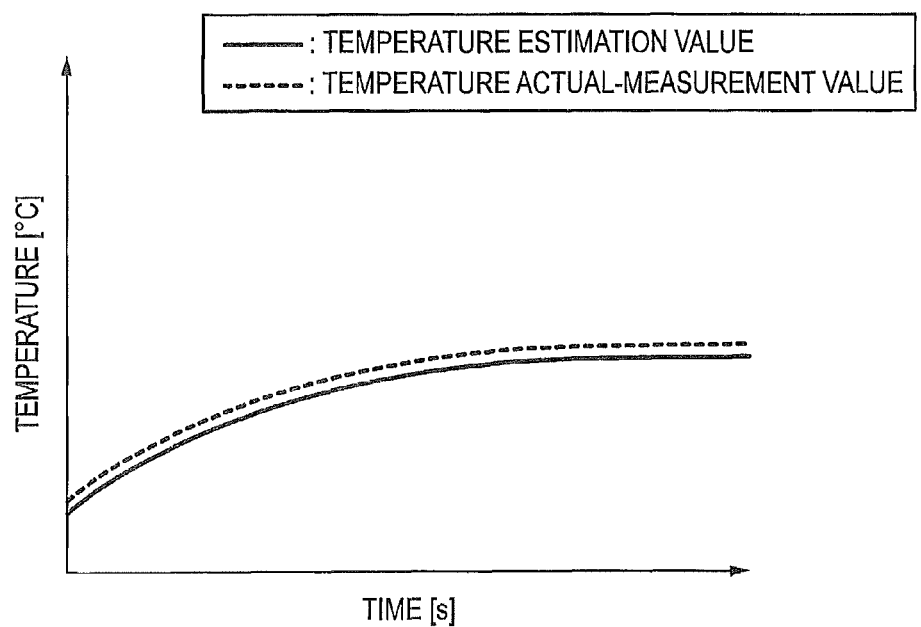
FIG. 11 is a graph illustrating comparison between a temperature actual-measurement value and a temperature estimation value of the housing.
Figure 13:
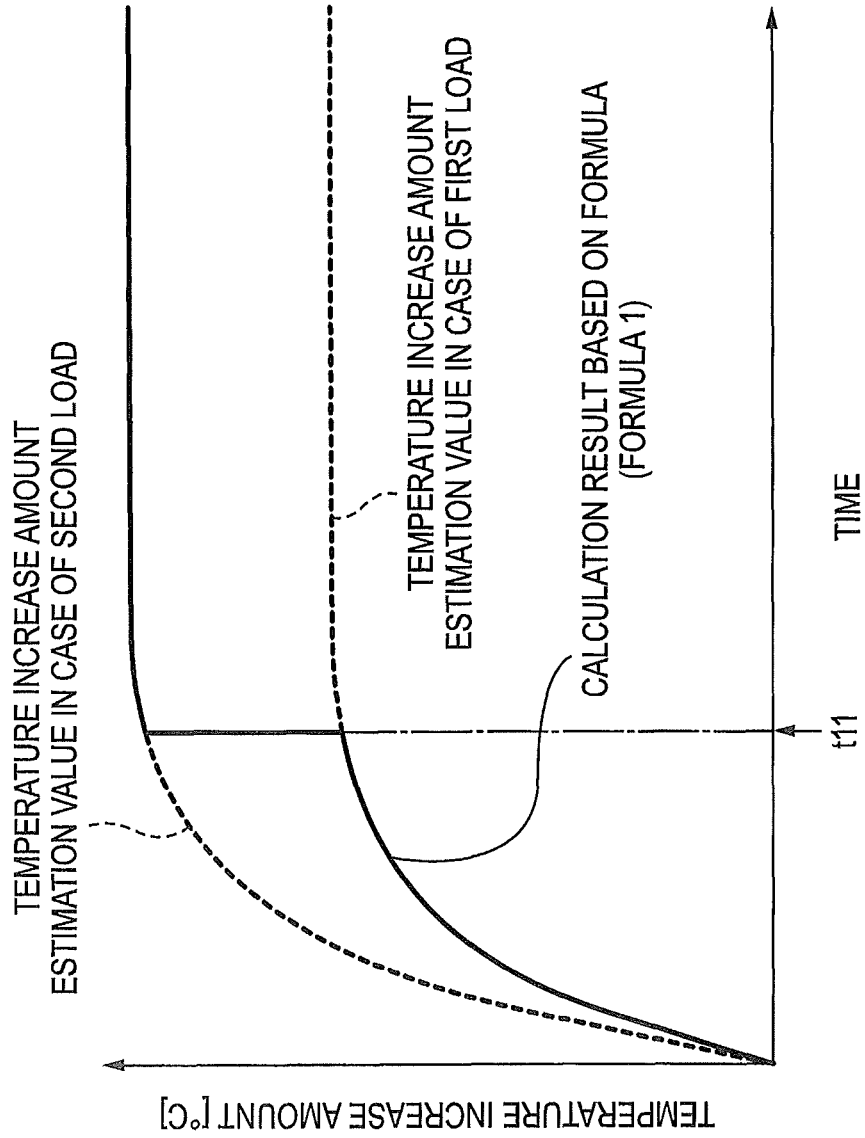
FIG. 13 is a graph illustrating a relationship between an estimation value of a temperature increase amount of a motor and a driving time of the motor when the load on the motor is changed during the driving of the motor.

The temperature increase rate ΔTm is calculated on the basis of the heat generation energy rate Ein at the time point of the motor 20 that is the main heat generation source of the hydro-brake unit 12 and the heat radiation energy rate Eout at the time point from the target member. For this reason, for example, during the driving of the motor 20, even when the driving torque T of the motor 20 fluctuates, the heat generation rate Ein is calculated on the basis of the current value Im flowing in the motor 20 and the voltage value Vm applied to the motor 20 at the time point. As a result, the heat generation energy rate Ein of the motor 20 is calculated with high precision even when the driving torque T fluctuates as compared with the case of the calculation using a value obtained by squaring the current value Im. As described above, since the heat generation energy rate Ein is estimated with high precision, the temperatures of the brush 28 and the yoke 21 of the motor 20, and the housing 30 are appropriately estimated even when the driving condition such as load on the motor 20 is changed during the driving of the motor 20 as shown in FIG. 9, FIG. 10, and FIG. 11.

Accordingly, in the embodiment, it is possible to obtain the following effects.

(1) The heat generation energy rate Ein of the motor 20 is obtained by subtracting the output power Pout from the motor 20 from the input power Pin to the motor 20. The heat radiation energy rate Eout from the target member is acquired by dividing the value obtained by the ambient temperature Tf from the previous temperature estimation value Tm(n−1) of the target member by the thermal coefficient A representing the thermal characteristics of the target member. The reason why the difference between the previous temperature estimation value Tm(n−1) of the target member and the ambient temperature Tf is used at the time of calculating the heat radiation energy rate Eout is because the heat radiation amount per unit time from the target member fluctuates by the magnitude of the difference. For this reason, it is possible to improve estimation precision of the heat radiation energy rate Eout from the target member by setting the thermal coefficient A to an appropriate value.

The temperature increase rate ΔTm(n) of the target member is acquired on the basis of the heat generation energy rate Ein of the motor 20 calculated as described above and the heat radiation energy rate Eout from the target member. As a result, differently from the related art case of calculating the temperature increase rate or the temperature increase amount using the thermal time constant of the motor 20, the variation of the estimation precision of the temperature increase rate ΔTm(n) caused by the magnitude of load or the fluctuation of load on the motor 20 is suppressed to be low. Accordingly, by improving the estimation precision of the current temperature estimation value Tm(n) of the target member, it is possible to improve the temperature estimation precision of the apparatus constituent members constituting the hydro-brake unit 12.

(2) As the method of calculating the heat generation energy rate Ein of the motor 20, a method of multiplying the value obtained by squaring the current value Im flowing in the motor 20 by a predetermined proportional constant can be considered. In this method, the heat generation energy rate Ein of the motor 20 is calculated using the input (that is, the current value) to the motor 20 without using the output from the motor 20. In this case, in a situation where the driving torque of the motor 20 fluctuates, there is a concern that variation may occur in estimation precision of the heat generation energy rate Ein. From this point, in the embodiment, the heat generation energy rate Ein is calculated using the input power Pin to the motor 20 and the output power Pout from the motor 20. That is, in the embodiment, the heat generation energy rate Ein of the motor 20 is calculated using not only the input to the motor 20 but also the output from the motor 20. Accordingly, even when the fluctuation occurs in the driving torque T of the motor 20, the heat generation energy rate Ein of the motor 20 is estimated with high precision, and thus it is possible to improve the estimation precision of the target member.

(3) Particularly, in a vehicle capable of using regenerative braking force at the time of deceleration, when the braking force (hereinafter, referred to as "requirement braking force") required by a driver is equal to or less than the maximum value of applicable regenerative braking force, the hydro-brake unit 12 is not driven. Meanwhile, when the requirement braking force is more than the maximum value of the regenerative braking force, the hydro-brake unit 12 is driven to supplement the difference between the requirement braking force and the regenerative braking force. In addition, the driving torque T required for the motor 20 in this case fluctuates according to the magnitude of the difference between the requirement braking force and the regenerative braking force. The temperature of the target member of the apparatus constituent members of the hydro-brake unit 12 driven under such use environment is estimated by the temperature estimating method of the embodiment. In other words, it is possible to improve the estimation precision of the temperature of the apparatus constituent member of the hydro-brake unit 12 in which a driving aspect of the motor 20 fluctuates from time to time.

(4) By individually preparing the thermal coefficient A and the coefficient K of each target member in advance to estimate the temperatures of the plurality of target members with characteristics about heat different from each other, it is possible to calculate the temperature estimation values Tb(n), Ty(n), and Th(n) of the target members using the same formula. That is, it is possible to reduce the control load of the temperature estimating unit 53 necessary for the temperature estimation of the target members as much as it is not necessary to prepare the calculation formula for each target member.

(5) In the motor 20 provided with the brush, the brush 28 is slid with respect to the rotor 24, and thus the brush 28 easily becomes a high temperature. When the brush 28 is broken down by the temperature increase, the motor 20 is also broken down. From this point, in the embodiment, the temperature of the brush 28 is estimated with high precision, and thus it is possible to start the restriction control of restricting the driving of the motor 20 at the proper timing before the brush 28 becomes too high temperature.

(6) Since the temperature of the brush 28 is estimated with high precision, it is possible to set the temperature threshold value for specifying the start timing of the restriction control to a relatively high value. As a result, it is possible to prevent the restriction control from starting at the timing when originally the motor 20 may be driven still. That is, it is possible to extend a permissible time of continuous driving of the motor 20.

(7) There is an electromagnetic valve, operation characteristics of which are changed by the temperature, of the electromagnetic valves 31 accommodated in the housing 30. The temperature of the electromagnetic valve 31 is changed according to the temperature change of the housing 30. For this reason, when it is possible to estimate the temperature around the electromagnetic valve 31 in the housing 30 with high precision, it is possible to estimate the temperature of the electromagnetic valve 31 accommodated in the housing 30. From this point, in the embodiment, the temperature of the part around the electromagnetic valve 31 in the housing 30 is estimated with high precision. For this reason, by adjusting the current value flowing in the electromagnetic valve 31 according to the temperature of the part around the electromagnetic valve 31 in the housing 30, the operation aspect variation of the electromagnetic valve 31 based on the temperature change of the electromagnetic valve 31 is suppressed. Accordingly, it is possible to appropriately control the braking force against the wheel 11.

(8) The temperature sensor SE1 is a sensor for detecting the temperature of the control device 50 provided on the circuit board 41. In the embodiment, the ambient temperature Tf is acquired using the temperature sensor SE1. For this reason, even when the temperature sensor for detecting the temperature around the motor 20 is not provided, it is possible to appropriately set the ambient temperature Tf, and further it is possible to improve the estimation precision of the heat radiation energy rate Eout of the target member.

Accordingly, in the embodiment, it is possible to obtain the following effects.

(1) The temperature of the brush 28 is estimated on the basis of the temperature provisional value TZb(n) of the brush 28 after stopping the driving of the motor 20, and is estimated on the basis of the temperature estimation values Ty(n) and Th(n) of the yoke 21 and the housing 30 smaller than the temperature provisional value TZb(n) of the brush 28 during the driving of the motor 20. That is, the temperature estimation value Tb(n) of the brush 28 becomes the largest value of the temperature provisional value TZb(n) of the brush 28, and the temperature estimation values Ty(n) and Th(n) of the yoke 21 and the housing 30. This is because possibility that the temperature of the brush 28 may be lower than the temperatures of the yoke 21 and the housing 30 with the thermal capacity higher than that of the brush 28 is low after stopping the driving of the motor 20. As described above, after stopping the driving of the motor 20, the temperature estimation value Tb(n) of the brush 28 is acquired in addition to the temperature estimation values of the other apparatus constituent members (the yoke 21 and the housing 30) positioned around the brush 28. Accordingly, after stopping the driving of the motor 20, it is possible to improve the estimation precision of the temperature of the brush 28 that is one of the apparatus constituent members constituting the hydro-brake unit 12 with high precision.

(2) The housing 30 is a member with the higher thermal capacity of the plurality of apparatus constituent members constituting the hydro-brake unit 12. For this reason, at the time of stopping the driving of the motor 20, the temperature of the brush 28 is not lower than the temperature of the housing 30. Accordingly, in the embodiment, the temperature estimation value Th of the housing 30 with the higher thermal capacity is acquired. At the time of stopping the driving of the motor 20, the current temperature estimation value Tb(n) of the brush 28 is set considering the current temperature estimation value Th(n) of the housing 30. For this reason, it is possible to improve the estimation precision of the temperature of the brush 28.

(3) The heat generation energy rate Ein of the motor 20 is obtained by subtracting the output power Pout from the motor 20 from the input power Pin to the motor 20. The heat radiation energy rate Eout_B from the brush 28 is acquired by dividing the value obtained by subtracting the ambient temperature Tf from the previous temperature provisional value TZb(n−1) of the brush 28 by the thermal coefficient A representing the thermal characteristics of the brush 28. The reason why the difference between the previous temperature provisional value TZb(n−1) of the brush 28 and the ambient temperature Tf is used at the time of calculating the heat radiation energy rate Eout_B is because the heat radiation amount per unit time from the brush 28 fluctuates according to the largeness and smallness of the difference. For this reason, by setting the thermal coefficient A to a proper value, it is possible to improve the estimation precision of the heat radiation energy rate Eout_B from the brush 28.

The temperature increase rate ΔTb(n) of the brush 28 is acquired on the basis of the heat generation energy rate Ein of the motor 20 calculated as described above and the heat radiation energy rate Eout_B from the brush 28. As a result, the estimation precision of the current temperature provisional value TZb(n) of the brush 28 is improved. At the time of driving the motor 20, the calculated temperature provisional value TZb(n) becomes the temperature estimation value Tb(n) of the brush 28. Accordingly, it is possible to improve the estimation precision of the temperature of the brush 28 at the time of driving the motor 20.

(4) If the estimation precision of the temperature of the brush 28 at the time of stopping the motor 20 is not satisfactory, it is difficult to estimate the temperature of the brush 28 during the driving of the motor 20 with high precision even when it is possible to acquire the temperature increase rate ΔTb(n) of the brush 28 during the driving of the motor 20 with high precision. This is because the temperature estimation value of the brush 28 just before starting driving the motor 20 is disparate from the actual temperature. From this point, in the embodiment, the temperature of the brush 28 is estimated with high precision even at the time of stopping the motor 20, and thus it is possible to estimate the temperature of the brush 28 during the driving of the motor 20 with high precision.

(5) As a method of calculating the heat generation energy rate Ein of the motor 20, a method of multiplying the value obtained by squaring the current value Im flowing in the motor 20 by a predetermined proportional constant is conceivable. In this method, the heat generation energy rate Ein of the motor 20 is calculated using the input (that is, current value) to the motor 20 without using the output from the motor 20. In this case, in the situation where the driving torque of the motor 20 fluctuates, there is a concern that the variation of the estimation precision of the heat generation energy rate Ein may occur. From this point, in the embodiment, the heat generation energy rate Ein is calculated using the input power Pin to the motor 20 and the output power Pout from the motor 20. That is, in the embodiment, the heat generation energy rate Ein is calculated using not only the input to the motor 20 but also the output from the motor 20. Accordingly, even when the fluctuation occurs in the driving torque T of the motor 20, the heat generation energy rate Ein of the motor 20 is estimated with high precision, and thus it is possible to improve the estimation precision of the brush 28.

(6) Particularly, in a vehicle capable of using regenerative braking force at the time of deceleration, when the braking force (hereinafter, referred to as "requirement braking force") required by a driver is equal to or less than the maximum value of applicable regenerative braking force, the hydro-brake unit 12 is not driven. Meanwhile, when the requirement braking force is more than the maximum value of the regenerative braking force, the hydro-brake unit 12 is driven to supplement the difference between the requirement braking force and the regenerative braking force. In addition, the driving torque T required for the motor 20 in this case fluctuates according to the magnitude of the difference between the requirement braking force and the regenerative braking force. The temperature of the brush 28 constituting the hydro-brake unit 12 driven under such use environment is estimated by the temperature estimating method of the embodiment. In other words, in the temperature estimating method of the embodiment, it is possible to improve the estimation precision of the temperature of the brush 28 of the hydro-brake unit 12 in which a driving aspect of the motor 20 fluctuates from time to time.

(5) In the motor 20 provided with the brush, the brush 28 is slid with respect to the rotor 24, and thus the brush 28 easily becomes a high temperature. When the brush 28 is broken down by the temperature increase, the motor 20 is also broken down. From this point, in the embodiment, the temperature of the brush 28 is estimated with high precision, and thus it is possible to start the restriction control of restricting the driving of the motor 20 at the proper timing before the brush 28 becomes too high temperature.

(8) Since the temperature of the brush 28 is estimated with high precision, it is possible to set the temperature threshold value for specifying the start timing of the restriction control to a relatively high value. As a result, it is possible to prevent the restriction control from starting at the timing when originally the motor 20 may be driven still. That is, it is possible to extend a permissible time of continuous driving of the motor 20.

(9) The temperatures estimation values Ty(n) and Th(n) of the yoke 21 and the housing 30 are calculated by the same method as the method of calculating the temperature provisional value TZb(n) of the brush 28. That is, it is possible to estimate the temperature estimation values Ty(n) and the Th(n) of the yoke 21 and the housing 30 without using a dedicated temperature sensor.

(10) There is an electromagnetic valve, the operation characteristics of which are changed by the temperature of the electromagnetic valves 31 accommodated in the housing 30. The temperature of the electromagnetic valve 31 is changed according to the temperature change of the housing 30. For this reason, when it is possible to estimate the temperature around the electromagnetic valve 31 in the housing 30 with high precision, it is possible to estimate the temperature of the electromagnetic valve 31 accommodated in the housing 30. From this point, in the embodiment, the temperature of the part around the electromagnetic valve 31 in the housing 30 is estimated with high precision. For this reason, by adjusting the current value flowing in the electromagnetic valve 31 according to the temperature of the part around the electromagnetic valve 31 in the housing 30, the operation aspect variation of the electromagnetic valve 31 based on the temperature change of the electromagnetic valve 31 is suppressed. Accordingly, it is possible to appropriately control the braking force against the wheel 11.

(11) The temperature sensor SE1 is a sensor for detecting the temperature of the control device 50 provided on the circuit board 41. In the embodiment, the ambient temperature Tf is acquired using the temperature sensor SE1. For this reason, even when the temperature sensor for detecting the temperature around the motor 20 is not provided, it is possible to appropriately set the ambient temperature Tf, and further it is possible to improve the estimation precision of the heat radiation energy rates Eout_B, Eout_Y, and Eout_H of the brush 28, the yoke 21, and the housing 30.

The embodiment may be modified to the other embodiments described as follows. In the embodiment, when a temperature sensor for detecting a temperature in an engine room of a vehicle is provided in the engine room, the ambient temperature calculating unit 534 may detect the ambient temperature Tf around the hydro-brake unit 12 on the basis of the detection signal from the temperature sensor.

The ambient temperature Tf may be a temperature acquired just after an ignition switch of the vehicle is turned on. The ambient temperature Tf in the case may be a preset temperature.

In the embodiment, the temperature estimating process routine may continue even when the ignition switch of the vehicle is turned off. In this case, when the temperature estimation value Tm(n) of the target member coincides with the ambient temperature Tf, the temperature estimating process routine may be ended.

In the embodiment, a sensor (for example, a rotary encoder) for detecting the number of rotations may be provided around the output shaft 241 of the motor 20, and the number of rotations N of the motor 20 may be detected on the basis of the detection signal from the sensor. In this case, the driving torque T of the motor 20 may be detected using the output from the sensor for detecting the number of rotations.

In the embodiment, the motor 20 may be provided with a torque detecting sensor, and the driving torque T of the motor 20 may be detected on the basis of the detection signal from the sensor. In the embodiment, temperatures of the other apparatus constituent members other than the brush 28, the yoke 21, and the housing 30 may be estimated. For example, the temperature of the armature coil 240b of the motor 20 may be estimated.

In the embodiment, the motor mounted on the electronic apparatus may be a brushless motor. That is, the motor may be a stepping motor and a voice coil motor.

The electronic apparatus of the invention may be embodied by the other apparatus other than the hydro-brake unit if it is an electronic apparatus of a vehicle. For example, the electronic apparatus may be embodied by an electric power steering device, and may be embodied by an electric parking brake device.

The electronic apparatus of the invention may be embodied by a home electronic apparatus such as a washing machine and a dish washer. Next, a technical concept which can be understood from the embodiment and the other embodiments is added to the following description.

(A) In the temperature estimating device, the electronic apparatus (12) includes a housing (30) in which the motor (20) is provided through the yoke (21), an accommodation case (40) that is provided in the housing (30), and a circuit board (41) that is disposed in the accommodation case (40), as the apparatus constituent members, the circuit board (41) includes a control device (50) that controls the electronic apparatus (12), and a temperature sensor (SE1) that detects a temperature in the accommodation case (41), and the temperature estimating device further includes ambient temperature acquiring unit (534 and S14) for acquiring an ambient temperature (Tf) around the electronic apparatus (12) on the basis of the temperature in the accommodation case (41) calculated using the temperature sensor (SE1).

The embodiment may be modified to the other embodiments described as follows. In the embodiment, a method of estimating temperatures of the other apparatus constituent members other than the brush 28 may be an arbitrary method other than the method described above. For example, the value obtained by squaring the current value Im flowing in the motor 20 may be multiplied by a predetermined proportional constant to obtain the heat generation energy rate Ein of the motor 20, and the temperature estimation values Ty(n) and Th(n) of the yoke 21 and the housing 30 may be calculated using the heat generation energy rate Ein.

In the embodiment, a temperature sensor for detecting a temperature of the other apparatus constituent member other than the brush 28 may be provided, and the temperature of the other apparatus constituent member may be detected on the basis of the detection signal from the sensor. In this case, after stopping the driving of the motor 20, the temperature of the brush 28 may be estimated using the detected temperature of the other apparatus constituent member.

In the embodiment, the temperature estimation value Ty(n) of the yoke 21 may not be acquired. In this case, after stopping the driving of the motor 20, the temperature estimation value Tb(n) of the brush 28 is set on the basis of the maximum value of the temperature provisional value TZb(n) of the brush 28 and the temperature estimation value Th(n) of the housing 30.

In the embodiment, the temperature estimation value of the other apparatus constituent member (for example, the end plate 22) other than the yoke 21 and the housing 30 may be acquired. However, it is preferable that the apparatus constituent member from which the temperature is acquired be a member with higher thermal capacity than that of the brush 28 that is the target member. After stopping the driving of the motor 20, the temperature estimation value Tb(n) of the brush 28 is set also using the temperature estimation value of the end plate 22.

In the embodiment, the target member may be the other apparatus constituent member (for example, the armature coil 240b) other than the brush 28. However, it is preferable that the target member be a member other than a member (in this case, the housing 30) with the higher thermal capacity of the apparatus constituent members constituting the hydro-brake unit 12.

After stopping the driving of the motor 20, the temperature estimation value Ty(n) of the yoke 21 may be the largest value of the temperature estimation value Ty(n) and the temperature estimation value Th(n) of the housing 30.

In the embodiment, the method of estimating the temperature of the target member may be an arbitrary method other than the method described above. For example, the value obtained by squaring the current value Im flowing in the motor 20 may be multiplied by a predetermined proportional constant to obtain the heat generation energy rate Ein of the motor 20, and the temperature provisional value of the target member may be calculated using the heat generation energy rate Ein.

After stopping the driving of the motor 20, when the temperature provisional value TZb(n) is smaller than the temperature of the other apparatus constituent member, the value obtained by multiplying the temperature by a predetermined coefficient may be the temperature estimation value Tb(n) of the brush 28.

In this case, when the temperature provisional value TZb(n) is smaller than the temperature estimation value Ty(n) of the yoke 21, the value obtained by multiplying the temperature estimation value Ty(n) by a predetermined first coefficient (a value larger than 1, for example, "1.1") may be the temperature estimation value Tb(n) of the brush 28. Thereafter, when the temperature estimation value Ty(n) of the yoke 21 is smaller than the temperature estimation value Th(n) of the housing 30, the value obtained by multiplying the temperature estimation value Th(n) by a predetermined second coefficient (a value larger than 1, for example, "1.2") may be the temperature estimation value Tb(n) of the brush 28. In this case, it is preferable that the second coefficient be larger than the first coefficient.

In the embodiment, when a temperature sensor for detecting a temperature in an engine room of a vehicle is provided in the engine room, the ambient temperature calculating unit 64 may detect the ambient temperature Tf around the hydro-brake unit 12 on the basis of the detection signal from the temperature sensor.

The ambient temperature Tf may be a temperature acquired just after an ignition switch of the vehicle is turned on. The ambient temperature Tf in the case may be a preset temperature.

In the embodiment, the temperature estimating process routine may continue even when the ignition switch of the vehicle is turned off. In this case, when the temperature estimation value Tb(n) of the brush 28 coincides with the ambient temperature Tf, the temperature estimating process routine may be ended.

In the embodiment, a sensor (for example, a rotary encoder) for detecting the number of rotations may be provided around the output shaft 241 of the motor 20, and the number of rotations N of the motor 20 may be detected on the basis of the detection signal from the sensor. In this case, the driving torque T of the motor 20 may be detected using the output from the sensor for detecting the number of rotations.

In the embodiment, the motor 20 may be provided with a torque detecting sensor, and the driving torque T of the motor 20 may be detected on the basis of the detection signal from the sensor. In the embodiment, the motor mounted on the electronic apparatus may be a brushless motor. That is, the motor may be a stepping motor and a voice coil motor.

The electronic apparatus of the invention may be embodied by the other apparatus other than the hydro-brake unit if it is an electronic apparatus of a vehicle. For example, the electronic apparatus may be embodied by an electric power steering device, and may be embodied by an electric parking brake device.

The electronic apparatus of the invention may be embodied by a home electronic apparatus such as a washing machine and a dish washer. Next, a technical concept which can be understood from the embodiment and the other embodiments is added to the following description.

According to the configuration described above, it is possible to set the ambient temperature of the installation environment of the electronic apparatus with high precision, and further it is possible to contribute to improvement of the estimation precision of the temperature of the target member.

(A) In the temperature estimating device, the temperature acquiring unit (70 and S19) acquire the temperature (Ty(n)) of the yoke (21) of the motor (20) as the temperature of the member of the other apparatus constituent member.

(B) In the temperature estimating device, the electronic apparatus (12) further includes a housing (30) in which a driving unit (32) using the motor (20) as a driving source is accommodated, the motor (20) is provided in the housing (30) mounted through the yoke (21), and the temperature acquiring unit (80 and S19) acquire the temperature (Th(n)) of the housing (30) as the temperature of the member of the other apparatus constituent member.

In the housing, a control target such as an electromagnetic valve controlled by a control device or the like is accommodated. Operation characteristics of the control target are slightly changed according to the temperature of itself. For this reason, when it is possible to accurately estimate the temperature of the control target, it is possible to more appropriately control the control target. For this reason, when it is possible to accurately estimate the temperature of the housing, it is possible to more appropriately operate the control target by performing the control of the control target based on the estimation result. From this point, in the invention, the temperature of the housing is estimated with high precision. As a result, it is possible to more appropriately operate the electromagnetic valve by performing the control of the control target based on the temperature estimation value of the housing.

(C) In the temperature estimating device, the electronic apparatus (12) adjusts braking force against the wheel (11) mounted on the vehicle, and an electromagnetic valve (31) is provided in the housing (30) to adjust the braking force against the wheel (11).

According to the configuration described above, the temperature of the housing is estimated with high precision, the control of the electromagnetic valve based on the estimation result is performed, and thus it is possible to more appropriately operate the electromagnetic valve. That is, it is possible to appropriately adjust the braking force against the wheel.

11: wheel, 12: hydro-brake unit as example of electric apparatus, 20: motor, 21: yoke, 22: end plate, 240a: core, 240b: armature coil, 241: output shaft, 242: commutator, 25: magnet, 26: bearing, 28: brush, 29A: urging member, 30: housing, 31: electromagnetic valve, 32: pump, 40: accommodation case, 41: circuit board, 50: control device, 53: temperature estimating unit, 533: heat generation energy calculating unit, 534: ambient temperature calculating unit, 535: heat radiation energy calculating unit, 536: temperature increase amount calculating unit, 537: temperature estimation value calculating unit, A: thermal coefficient, Ein: heat generation energy rate, Eout, Eout_B, Eout_Y, Eout_H: heat radiation energy rate, Pin: input power, Pout: output power, SE1: temperature sensor, Tf: ambient temperature, Tm(n), Tb(n), Ty(n), Th(n): current temperature estimation value, Tm(n−1), Tb(n−1), Ty(n−1), Th(n−1): previous temperature estimation value, $\Delta$Tm(n), $\Delta$Tb(n), $\Delta$Ty(n), $\Delta$Th(n): temperature increase rate.

What is claimed is:

1. A temperature estimating device which estimates temperatures of a target member of an apparatus constituent member constituting an electronic apparatus every period, wherein said electronic apparatus is configured to adjust braking force on a wheel mounted on a vehicle and is provided with a motor for braking, the device comprising:

a heat generation amount calculating unit for calculating heat generation amount of the motor on the basis of a difference between an input energy corresponding value corresponding to input energy to the motor and an output energy corresponding value corresponding to output energy from the motor, wherein said input energy to the motor is calculated based on a current value flowing through the motor and a voltage value applied to the motor, and said output energy from the motor is calculated based on a number of rotations of an output shaft of the motor and driving torque of the motor;

a heat radiation amount calculating unit for calculating heat radiation amounts from the target member on the basis of a difference between a previous temperature estimation value of the target member and an ambient temperature around the electronic apparatus, and thermal coefficient representing thermal characteristic of the target member; and an estimation value calculating unit for acquiring a temperature increase amount of the target member on the basis of a difference between the heat generation amount and the heat radiation amount calculated by the calculating unit, and calculating a current temperature estimation value of the target member on the basis of the temperature increase amount and the previous temperature estimation value of the target member.

2. The temperature estimating device according to claim 1, wherein
the estimation value calculating unit is configured to estimate the temperature estimation values of the plurality of target members,
in the calculation of the heat radiation amounts from a first target member, the heat radiation amount calculating unit calculates the heat radiation amounts from the first target member on the basis of a difference between the previous temperature estimation values of the first target members and the ambient temperature, and the thermal coefficient representing the thermal characteristics of the first target member, and
in the calculation of the heat radiation amounts from a second target member, the heat radiation amount calculating unit calculates the heat radiation amounts from the second target member on the basis of a difference between the previous temperature estimation values of the second target member and the ambient temperature, and the thermal coefficient representing the thermal characteristics of the second target member.

3. The temperature estimating device according to claim 1, wherein
the motor is provided with a brush,
the heat radiation amount calculating unit calculates the heat radiation amount from the brush of the motor as the heat generation amount from the target member, and
the estimation value calculating unit calculates the current temperature estimation value of the brush.

4. The temperature estimating device according to claim 1, wherein
the heat radiation amount calculating unit calculates the heat radiation amount from a yoke of the motor as the heat radiation amount from the target member, and
the estimation value calculating unit calculates the current temperature estimation value of the yoke.

5. The temperature estimating device according to claim 1, wherein
the electronic apparatus further includes a housing in which a driving unit provided with the motor as a driving source is accommodated,
the motor is provided in the housing through the yoke,
the heat radiation amount calculating unit calculates the heat radiation amount from the housing as the heat radiation amount from the target member, and
the estimation value calculating unit calculates the current temperature estimation value of the housing.

6. The temperature estimating device according to claim 5, wherein an electromagnetic valve that operates to adjust the braking force is provided in the housing.

7. A temperature estimating device which estimates a temperature of a target member of apparatus constituent members constituting an electronic apparatus provided with a motor for each predetermined period, the device comprising:
a provisional value estimating unit for estimating a temperature provisional value of the target member;
a temperature acquiring unit for acquiring temperatures of the another apparatus constituent member which is different from the target member of the apparatus constituent members; and
an estimation value setting unit for setting a temperature estimation value of the target member,
wherein at the time of driving the motor, the estimation value setting unit sets the current temperature provisional value of the target member estimated by the provisional value estimating unit to the current temperature estimation value of the target member, and
wherein after stopping the driving of the motor, the estimation value setting unit sets the current temperature estimation value of the target member on the basis of the higher one of the current temperature of the particular apparatus constituent member whose temperature was lower than the temperature provisional value of the target member at the time of driving the motor and the current temperature provisional value of the target member.

8. The temperature estimating device according to claim 7, wherein
the provisional value estimating unit include:
a heat generation amount calculating unit for calculating the heat generation amount of the motor on the basis of a difference between an input energy corresponding value corresponding to input energy to the motor and an output energy corresponding value corresponding to output energy from the motor;
a heat radiation amount calculating unit for calculating the heat radiation amount from the target member on the basis of a difference between the last temperature provisional value of the target member and an ambient temperature around the electronic apparatus, and a thermal coefficient representing thermal characteristics of the target member; and
a provisional value calculating unit for acquiring a temperature increase amount of the target member on the basis of a difference between the heat generation amount and the heat radiation amount calculated by the calculating unit and calculating the current temperature provisional value of the target member on the basis of the temperature increase amount and the last temperature provisional value.

9. The temperature estimating device according to claim 7, wherein
the motor is a motor provided with a brush,
the provisional value estimating unit estimates the temperature provisional value of the brush of the motor as a temperature provisional value of the target member, and
after stopping the driving of the motor, the estimation value setting unit sets the current temperature estimation value of the brush on the basis of the higher one of the current temperature of the particular apparatus constituent member acquired by the temperature acquiring unit and the current temperature provisional value of the brush estimated by the provisional value estimating unit.

10. The temperature estimating device according to claim 8, wherein the temperature acquiring unit acquires temperatures of the other apparatus constituent members with larger thermal capacity than that of the target member.

11. The temperature estimating device according to claim 7, wherein the temperature acquiring unit includes:
a heat generation amount calculating unit for calculating the heat generation amount of the motor on the basis of a difference between an input energy corresponding value corresponding to input energy to the motor and an output energy corresponding value corresponding to output energy from the motor;
a heat radiation amount calculating unit for calculating the heat radiation amounts from the other apparatus constituent members on the basis of a difference between the last temperature estimation values of the other apparatus constituent member and the ambient temperature around the electronic apparatus, and thermal coefficients based on the thermal characteristics of the other apparatus constituent members; and an estimation value calculating unit for acquiring the temperature increase amounts of the other apparatus constituent members on the basis of a difference between the heat generation amount and the heat radiation amounts calculated by the calculating unit and calculating the current temperature estimation values of the other apparatus constituent members on the basis of the temperature increase amounts and the last temperature estimation values of the other apparatus constituent members.

12. A temperature estimating method of estimating a temperature of a target member of apparatus constituent members constituting an electronic apparatus provided with a motor for each predetermined period, the method comprising:

a provisional value estimating step of estimating a temperature provisional value of the target member;

a temperature acquiring step of acquiring temperatures of the other apparatus constituent members which is different from the target member of the apparatus constituent members;

an estimation value setting step of setting the temperature provisional value of the target member estimated in the provisional value estimating step to the current temperature estimation value of the target member at the time of driving the motor; and an estimation value setting step of setting the current temperature estimation value of the target member on the basis of the higher one of the current temperature of the particular apparatus constituent members whose temperature was lower than that of the temperature provisional value of the target member at the time of driving the motor and the current temperature provisional value of the target member after stopping the driving of the motor.

* * * * *